(12) United States Patent
Schlenoff

(10) Patent No.: US 8,071,255 B2
(45) Date of Patent: Dec. 6, 2011

(54) HYDROPHOBIC FLUORINATED POLYELECTROLYTE COMPLEX FILMS AND ASSOCIATED METHODS

(75) Inventor: Joseph B. Schlenoff, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 118 days.

(21) Appl. No.: 12/727,930

(22) Filed: Mar. 19, 2010

(65) Prior Publication Data

US 2010/0173224 A1 Jul. 8, 2010

Related U.S. Application Data

(63) Continuation of application No. 10/594,185, filed as application No. PCT/US2005/010282 on Mar. 28, 2005, now Pat. No. 7,713,629.

(60) Provisional application No. 60/631,711, filed on Nov. 30, 2004, provisional application No. 60/557,029, filed on Mar. 26, 2004.

(51) Int. Cl.
H01M 8/10 (2006.01)
B32B 27/00 (2006.01)
B32B 27/40 (2006.01)
C10M 143/00 (2006.01)

(52) U.S. Cl. ........ 429/494; 429/492; 429/493; 429/479; 429/316; 428/421; 428/422; 525/199; 525/200; 508/106; 508/588; 508/589; 508/590

(58) Field of Classification Search .................. 429/494, 429/492, 493, 479; 428/421, 422
See application file for complete search history.

(56) References Cited

U.S. PATENT DOCUMENTS

| | | | |
|---|---|---|---|
| 3,467,604 A | 9/1969 | Michaels | |
| 3,717,679 A | 2/1973 | Thompson et al. | |
| 4,169,023 A | 9/1979 | Sata et al. | |
| 4,289,600 A | 9/1981 | Lazarz et al. | |
| 4,316,789 A | 2/1982 | Iijima et al. | |
| 4,497,720 A | 2/1985 | Moriga et al. | |
| 4,501,835 A | 2/1985 | Berke | |
| 4,554,076 A | 11/1985 | Speaker | |
| 4,654,235 A | 3/1987 | Effenberger et al. | |
| 4,863,823 A | 9/1989 | Hiro et al. | |
| 4,920,021 A | 4/1990 | Kimura et al. | |
| 5,208,111 A | 5/1993 | Decher et al. | |
| 5,312,710 A | 5/1994 | Tomita et al. | |
| 5,380,644 A | 1/1995 | Yonkoski et al. | |
| 5,563,016 A | 10/1996 | Baur et al. | |
| 5,711,915 A | 1/1998 | Siegmund et al. | |
| 5,736,274 A | 4/1998 | Umemoto et al. | |
| 5,807,636 A | 9/1998 | Sheu et al. | |
| 5,939,323 A | 8/1999 | Valentini et al. | |
| 6,355,300 B1 | 3/2002 | Stirniman et al. | |
| 6,402,918 B1 | 6/2002 | Schlenoff et al. | |
| 6,468,657 B1 | 10/2002 | Hou et al. | |
| 6,562,446 B1* | 5/2003 | Totsuka | 428/304.4 |
| 6,610,789 B2 | 8/2003 | Watakabe et al. | |
| 6,670,309 B2 | 12/2003 | Chiba et al. | |
| 6,797,444 B2 | 9/2004 | Itami | |
| 6,841,054 B2 | 1/2005 | Schlenoff et al. | |
| 6,860,980 B2 | 3/2005 | Locascio et al. | |
| 7,018,709 B2 | 3/2006 | Stevenson et al. | |
| 7,101,947 B2 | 9/2006 | Schlenoff et al. | |
| 7,223,327 B2 | 5/2007 | Schlenoff et al. | |
| 7,261,771 B2 | 8/2007 | Schlenoff | |
| 7,285,421 B2 | 10/2007 | Schlenoff et al. | |
| 7,314,550 B2 | 1/2008 | Warner et al. | |
| 7,357,999 B2 | 4/2008 | Kim | |
| 7,722,752 B2 | 5/2010 | Schlenoff et al. | |
| 2003/0078388 A1 | 4/2003 | Basey et al. | |
| 2003/0113604 A1* | 6/2003 | Bahar et al. | 429/30 |
| 2003/0169227 A1* | 9/2003 | Wu et al. | 345/107 |
| 2003/0215626 A1 | 11/2003 | Hiller et al. | |
| 2004/0022691 A1 | 2/2004 | Allen et al. | |
| 2004/0191504 A1* | 9/2004 | Stevenson et al. | 428/332 |
| 2004/0265603 A1 | 12/2004 | Schlenoff | |
| 2005/0282925 A1 | 12/2005 | Schlenoff et al. | |
| 2005/0287111 A1 | 12/2005 | Schlenoff et al. | |

FOREIGN PATENT DOCUMENTS

WO 03014234 A1 2/2003

OTHER PUBLICATIONS

Barker, S. L. R., et al., "Control of Flow Direction in Microfluidic Devices with Polyelectrolyte Multilayers," Analytical Chemistry, Dec. 15, 2000, pp. 5925-5929, vol. 72, No. 24.
Caruso, F., et al., "Coated Colloids: Preparation, Characterization, Assembly and Utilization," Chapter 12, Multilayer Thin Films, 2003, pp. 331-362.
Chen, W., et al., "Layer-by-Layer Deposition: A Tool for Polymer Surface Modification," Macromolecules, 1997, pp. 78-86, vol. 30, No. 1.
Cheng, Y., et al., "Ultrathin Polypeptide Multilayer Films for the Fabrication of Model Liquid/Liquid Electrochemical Interfaces," J. Phys. Chem. B, 1999, pp. 8726-8731, vol. 103, No. 41.
Dai, J., et al., "Controlling the Permeability of Multilayered Polyelectrolyte Films Through Derivatization, Cross-Linking, and Hydrolysis," Langmuir, 2001, pp. 931-937, vol. 17, No. 3.
Decher, G., "Fuzzy Nanoassemblies: Toward Layered Polymeric Multicomposites," Science, Aug. 29, 1997, pp. 1232-1237, vol. 277.
Decher, G., "Polyelectrolyte Multilayers, An Overview," Chapter 1, Multilayer Thin Films, 2002, pp. 1-46.
Delongchamp, D. M., et al., "Fast Ion Conduction in Layer-by-Layer Polymer Films," Chem. Mater., 2003, pp. 1165-1173, vol. 15, No. 5.
Deyoung, J. P., et al., "Synthesis of Fluoropolymers in Liquid and Supercritical Carbon Dioxide Solvent Systems," Chapter 13, Fluoropolymers 1 Synthesis, 1999, pp. 191-205.

(Continued)

Primary Examiner — Vasu Jagannathan
Assistant Examiner — Irina Krylova
(74) Attorney, Agent, or Firm — Senniger Powers LLP

(57) ABSTRACT

A fuel cell comprising a proton transporting membrane is provided. The proton transporting membrane comprises a polyelectrolyte film comprising a multilayer comprising an interpenetrating network of a net positively charged polyelectrolyte polymer comprising repeat units with at least two fluorine atoms and a net negatively charged polyelectrolyte polymer comprising repeat units with at least two fluorine atoms, and further comprising a fluorinated counterion within the multilayer.

21 Claims, 13 Drawing Sheets

OTHER PUBLICATIONS

Durstock, M. F., et al., "Dielectric Properties of Polyelectrolyte Multilayers," Langmuir, 2001, pp. 7865-7872, vol. 17, No. 25.

Friend, R. H., et al., "Electroluminscence in Conjugated Polymers," Chapter 29, Handbook of Conducting Polymers, 1998, pp. 823-845.

Good, R. J., "Contact Angle, Wetting, and Adhesion: A Critical Review," J. Adhesion Sci. Technol., 1992, pp. 1269-1302, vol. 6, No. 12.

Hsieh, M. C., et al., "Surface "Priming" for Layer-by-Layer Deposition: Polyelectrolyte Multilayer Formation on Allylamine Plasma-Modified Poly(tetrafluoroethylene)," Macromolecules, 1997, pp. 8453-8458, vol. 30, No. 26.

Hyde, F. W., et al., "Comparison of Fluorinated Polymers Against Stainless Steel, Glass and Polypropylene in Microbial Biofilm Adherence and Removal," Journal of Industrial Microbiology and Biotechnology, Jul. 15, 1997, pp. 142-149, vol. 19.

Iler, R.K., "Multilayers of Colloidal Particles," Journal of Colloid and Interface Science, 1966, pp. 569-594, vol. 21.

Jisr, R. M., et al., "Hydrophobic and Ultrahydrophobic Multilayer Thin Films from Perfluorinated Polyelectrolytes," Angew. Chem. Int. Ed., 2005, pp. 782-785, vol. 44.

Kozlovskaya, V., et al., "Hydrogen-Bonded Polymer Capsules Formed by Layer-by-Layer Self-Assembly," Macromolecules, 2003, pp. 8590-8592, vol. 36, No. 23.

Losche, M., et al., "Detailed Structure of Molecularly Thin Polyelectrolyte Multilayer Films on Solid Substrates as Revealed by Neutron Reflectometry," Macromolecules, 1998, pp. 8893-8906, vol. 31, No. 25.

Mamedov, A. A., et al., "Free-Standing Layer-by-Layer Assembled Films of Magnetite Nanparticles," Langmuir, 2000, pp. 5530-5533, vol. 16, No. 13.

Michaels, A. S., "Polyelectrolyte Complexes," Industrial and Engineering Chemistry, Oct. 1965, pp. 32-40, vol. 57, No. 10.

Oner, D., et al., "Ultrahydrophobic Surfaces. Effects of Topography Length Scales on Wettability," Langmuir, 2000, pp. 7777-7782, vol. 16, No. 20.

Park, J., et al., "Stamping of Fluorinated Copolymers for Microfluidic Applications," Polymer Preprints, 2003, pp. 1-2, vol. 44, No. 1.

Rosidian, A., et al., "Ionic Self-Assembly of Ultrahard $ZrO_2$/Polymer Nanocomposite Thin Films," Advanced Materials, 1998, pp. 1087-1091, vol. 10, No. 14.

Salloum D. S., et al., "Vascular Smooth Muscle Cells on Polyelectrolyte Multilayers: Hydrophobicity-Directed Adhesion and Growth," Biomacromolecules, 2005, pp. 161-167, vol. 6, No. 1.

Schlenoff, J. B., et al., "Sprayed Polyelectrolyte Multilayers," Langmuir, 2000, pp. 9968-9969, vol. 16, No. 26.

Thompsett, D., "Catalysts for the Proton Exchange Membrane Fuel Cell," Chapter 6, Fuel Cell Technology Handbook, 1989, pp. 6-1-6-23.

Yang, B., et al., "Multilayered Membranes with Suppressed Fuel Crossover for Direct Methanol Fuel Cells," Electrochemistry Communications 6, 2004, pp. 231-236.

Yoo, D., et al., "Controlling Bilayer Composition and Surface Wettability of Sequentially Absorbed Multilayers of Weak Polyelectrolytes," Macromolecules, 1998, pp. 4309-4318, vol. 31, No. 13.

\* cited by examiner

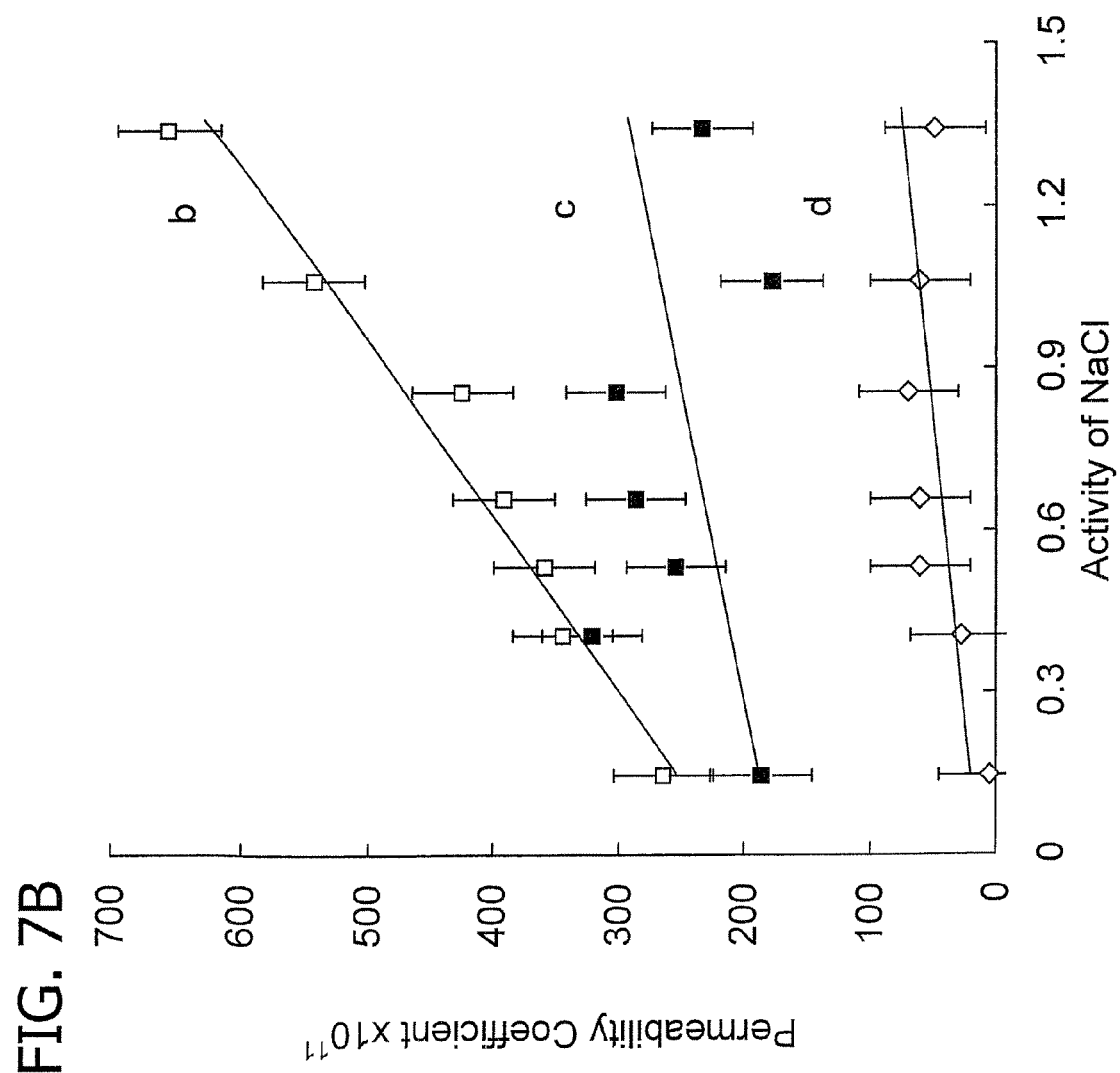

HYDROPHOBIC FLUORINATED POLYELECTROLYTE COMPLEX FILMS AND ASSOCIATED METHODS

CROSS-REFERENCE TO RELATED APPLICATIONS

This application is a continuation application of U.S. application Ser. No. 10/594,185, which was filed on Jun. 8, 2007 and published as U.S. 2007/0265174. U.S. application Ser. No. 10/594,185 claims priority from PCT/US2005/010282, filed on Mar. 28, 2005, which claims priority from U.S. provisional application Ser. No. 60/631,711, filed on Nov. 30, 2004 and from U.S. provisional application Ser. No. 60/557,029, filed on Mar. 26, 2004.

STATEMENT REGARDING FEDERALLY SPONSORED RESEARCH

This invention was made with Government support under Grant DMR 0309441 awarded by the National Science Foundation. The Government has certain rights in this invention.

BACKGROUND OF THE INVENTION

This invention relates generally to ultrathin polymeric membranes. More specifically, the invention relates to hydrophobic fluorinated polyelectrolyte multilayer films and methods for using them.

Hydrophobic, or water-repelling, coatings are known to be useful for many applications. Fluorinated materials are known for their hydrophobicity. Thus, fluorinated hydrocarbons have been applied as surface treatment to fabric, yarn, upholstery, garments, and carpets to impart water- and stain-repellency to these materials. Well known fluorinated materials include Scotchguard™ Protector (3M Company) and Teflon™ Advanced (DuPont Inc.) carpet protector. Many water-repellant fluorinated materials are anionic perfluorinated small molecules which may be rubbed off surfaces to which they are applied, and which have caused concerns regarding environmental and health effects (in particular, perfluorooctanesulfonates). There is a need for a persistent fluorinated coating which has mechanical integrity, such as a thin polymer film.

The term "perfluorinated" as applied to polymers generally refers to polymers comprising repeat units that bear a plurality of fluorine groups (at least two). Unfortunately, fluorinated polymers are hard to process into thin films, as many are insoluble and/or infusible. Thus, coatings of perfluorinated polymers such as polytetrafluoroethylene (PTFE, or Teflon™) are produced by coating an article with PTFE powder then heat-treating to sinter and bind the particles together. Alternatively, a fluorinated polymer film is prepared on a surface by microwave, plasma, or reactive gas deposition of fluorinated monomer. There is a need for materials and methods to produce thin highly fluorinated polymer coatings on surfaces under ambient conditions.

Polyelectrolytes are macromolecules comprising a plurality of charged repeat units. Amorphous complexes may be formed by contacting solutions of polyelectrolytes bearing opposite charges. The driving force for association, or complexation, of polyelectrolytes is multiple ion pairing between oppositely charged repeat units on different molecules.

Recently, thin films of polyelectrolyte complexes have been prepared using polyelectrolytes which are alternately deposited on a substrate or substratum. See Decher and Schlenoff, Eds., *Multilayer Thin Films—Sequential Assembly of Nanocomposite Materials*, Wiley-VCH, Weinheim (2003); Decher, *Science*, 277, 1232 (1997). Decher and Hong (U.S. Pat. No. 5,208,111) disclose a method for a buildup of multilayers by alternating dipping, i.e., cycling a substrate between two reservoirs containing aqueous solutions of polyelectrolytes of opposite charge, with an optional rinse step in polymer-free solution following each immersion. Each cycle adds a layer of polymer via ion pairing forces to the oppositely-charged surface and reverses the surface charge thereby priming the film for the addition of the next layer. Films prepared in this manner tend to be uniform, follow the contours and irregularities of the substrate, and are typically between about 10 nM and about 10,000 nm thick. The thickness of a film depends on many factors, including the number of layers deposited, the ionic strength of the solutions, the types of polymers, the deposition time, the solution pH, the temperature, and the solvent used. Although studies have shown that the substantial interpenetration of the individual polymer layers results in little composition variation over the thickness of a film, such polymer thin films are, nevertheless, referred to as polyelectrolyte multilayers (PEMUs).

SUMMARY OF THE INVENTION

Among the aspects of this invention may be noted the preparation of thin films of polyelectrolyte complex, said films may comprise at least one negative polyelectrolyte comprising polymer repeat units with at least two fluorine groups and at least one positive polyelectrolyte comprising polymer repeat units with at least two fluorine groups. A polyelectrolyte comprising repeat units bearing at least two fluorine groups is henceforth termed a "fluorinated polyelectrolyte." A polyelectrolyte film comprising a negative fluorinated polyelectrolyte and a positive fluorinated polyelectrolyte is henceforth termed a "highly fluorinated thin film polyelectrolyte complex," HFTFPC.

Another feature of this invention is to employ positive fluorinated polyelectrolytes prepared by the alkylation of a nitrogen group by an alkylating molecule comprising two or more fluorine atoms. Said alkylating molecule also comprises a group that may be displaced on reaction (a "leaving group") that is well known to those skilled in the art. Examples of preferred leaving groups are chloride, bromide, iodide, and toluene sulfonate. Preferred nitrogen-containing groups on polymers to be alkylated are the pyridine group, imidazoles, and primary, secondary, or tertiary amines. Advantageously, alkylation often proceeds with the simultaneous creation of a positive charge. For efficiency of alkylation, preferred fluorinated hydrocarbons have one or two carbons next to the leaving groups that do not bear fluorines.

Yet another feature of this invention is to prepare said HFTFPCs using copolyelectrolytes comprising fluorinated and non-fluorinated monomers. Said monomers may be disposed in a random or block fashion on the backbone of said copolyelectrolytes. Preferred fluorinated copolyelectrolytes comprise charged non-fluorinated with noncharged fluorinated repeat units, or charged fluorinated with noncharged nonfluorinated repeat units. Other preferred fluorinated polyelectrolytes comprise charged fluorinated repeat units with charged nonfluorinated repeat units. Preferred charged non-fluorinated polyelectrolyte repeat units include sulfonates, styrenesulfonates, 2-acrylamido-2-methyl-1-propane sulfonic acid, ethylenesulfonic acid, methacryloxyethylsulfonic acid, sulfonated ether ether ketone, diallyldialkyllammonium, vinylbenzyltrimethylammonium, ionenes, acryloxyethyltrimethyl ammonium chloride, methacryloxy(2-hydroxy)propyltrimethyl ammonium, N-methylvinylpyridinium, other N-alkylvinyl pyridiniums, N-aryl vinyl pyridiniums, alkyl- or aryl imidazolium, carboxylates such as acrylic acid and methacrylic acid, phosphates, protonated pyridines, protonated imidazoles, and protonated primary, secondary, or tertiary amines. Mole percentages of fluorinated repeat units on fluorinated copolyelectrolytes are preferably from 10% to 95%, more preferably 20% to 95%. Preferably, fluorinated copolyelectrolytes comprising charged fluorinated groups and charged unfluorinated groups are formed by the alkylation of residual nitrogen groups that were not fluorinated by the fluorinated alkylating agent. Fluorinated copolyelectrolytes are preferably made by post-polymerization reactions on polymers, such as alkylation, or by polymerization of fluorinated monomers or mixtures of fluorinated monomers. Preferred uncharged fluorinated monomers include fluorovinyl ethers, such as $CF_2$=CF$(OC_2F_4)_n$—R where n is from 1 to 12 and R is a hydroxyl; alkoxy; aryl; or alkyl group, vinylperfluoroesters, and vinylperfluoracrylates. Preferred anionic fluorinated polyelectrolytes comprise the sulfonate group. Preferred anionic fluorinated polyelectrolytes comprising the sulfonate group are Nafion™ and sulfonated perfluorinated alkylvinyl vinyl ethers.

Briefly, therefore, the present invention is directed to a polyelectrolyte film comprising an interpenetrating network of a net positively charged polymer and a net negatively charged polymer, wherein the net positively charged polymer, the net negatively charged polymer, or both contain polymer repeat units with at least two fluorine atoms.

The invention is further directed to a film comprising a fluorinated charged polymer and a fluorinated charged particle, wherein the charge of the polymer is opposite that of the charge of the particle.

The invention is further directed to a method for controlling the hydrophobicity of a surface of an article, the method comprising alternately depositing solutions comprising net positively charged polymers and net negatively charged polymers onto the surface of the article to form a polyelectrolyte film of an interpenetrating network of net positively charged polymers and net negatively charged polymers on the surface of the article, wherein the net positively charged polymer, the net negatively charged polymer, or both contain polymer repeat units with at least two fluorine atoms.

Other objects and aspects of the invention will be, in part, pointed out and, in part, apparent hereinafter.

BRIEF DESCRIPTION OF THE DRAWINGS

FIGS. 7A and 7B show permeability coefficients of 1 mM potassium ferricyanide, $K_3Fe(CN)_6$, through (a) (PDADMA/PSS)$_7$ @0.25 M NaCl, (b) (PDADMA/Nafion)$_7$, (c) (PFPVP/PSS)$_7$, and (d) (PFPVP/Nafion)$_7$ obtained according to the method of Example 9. All the polymer deposition solutions were 1 mM based on repeat unit and were deposited from no salt except for the (PDADMA/PSS)$_7$ @ 0.25M NaCl. A magnified diagram of 7A (depicted as FIG. 7B) shows the permeability of 1 mM potassium ferricyanide through 3 multilayer systems: (b) (PDADMA/Nafion)$_7$, (c) (PFPVP/PSS)$_7$, and (d) (PFPVP/Nafion)$_7$. All the polymer deposition solutions were 1 mM based on the repeat unit and were deposited from no salt. Two rotating disk electrodes, bare and coated, were used, and their areas were 0.486 cm$^2$ and 0.459 cm$^2$ respectively. Rotation rate was 1000 rpm. SCE was used as a reference electrode. Voltage scan was in the range (−0.05 V to 0.5 V) versus SCE.

FIG. 11A shows bare steel. FIG. 11B shows a plate coated with Nafion/PFPVP (40 layers, 300 nm thick).

DETAILED DESCRIPTION OF THE PREFERRED EMBODIMENT(S)

Figure 1:
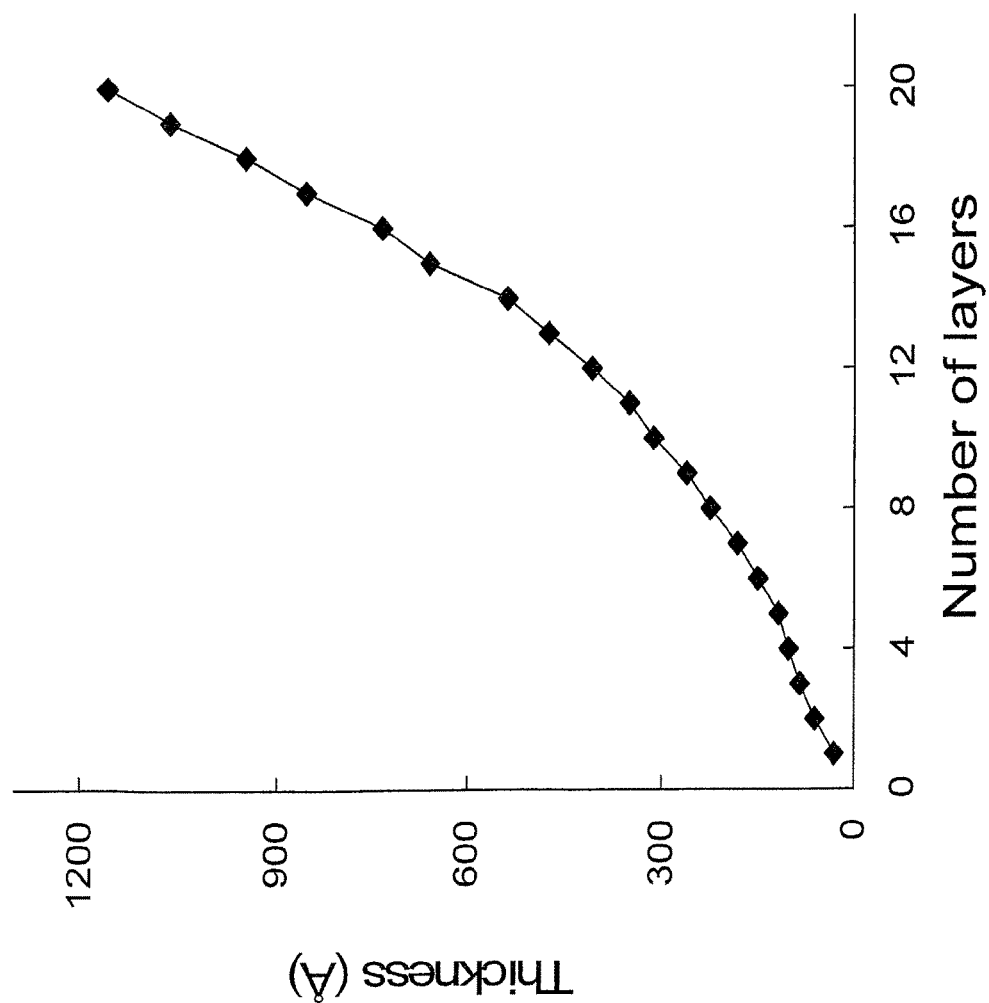
FIG. 1 shows layer-by-layer buildup of PEI(Nafion/PFPVP)$_{10}$ on double side polished silicon wafer monitored by ellipsometry according to the method of Example 2. Refractive index was determined by the instrument to be 1.40.

The highly fluorinated thin film polyelectrolyte complexes ("HFTFPCs") of the present invention may comprise net negatively charged polyelectrolytes comprising polymer repeat units with at least two fluorine atoms, net positively charged polyelectrolytes comprising polymer repeat units with at least two fluorine atoms, or both. Preferably, the polyelectrolyte complex comprises both positively and negatively charged polyelectrolytes comprising repeat units with at least two fluorine atoms.

The fluorinated polyelectrolytes for use in HFTFPCs may comprise fluorinated charged repeat units (e.g., fluorinated and positively charged pendant groups or fluorinated and negatively charged pendant groups), fluorinated uncharged or neutral repeat units (e.g., fluorinated uncharged pendant groups or fluorinated zwitterionic groups), unfluorinated charged repeat units (e.g., positively charged pendant groups or negatively charged pendant groups), or unfluorinated uncharged or neutral repeat units (e.g., unfluorinated uncharged pendant groups or unfluorinated zwitterionic groups). The various types of repeat units are present in random, block, or graft co-polymers, or as homopolymers. Fluorinated repeat units, either charged; uncharged; or zwitterionic; preferably comprise fluorine groups, present as a fluorinated conjugated group, $=CF-$, fluorinated methylene group, $-CF_2-$, or fluorinated methyl group, $-CF_3$. These moieties may be present in fluorinated aliphatic groups, fluorinated olefinic groups, fluorinated aryl groups, or fluorinated heteroaryl groups. The fluorinated repeat unit comprises at least 2 fluorine atoms. Typically, the fluorinated repeat unit comprises between 2 and 21 fluorine atoms, more typically between 2 and 17 fluorine atoms, and even more typically between 2 and 13 fluorine atoms. Preferably, at least 5% of the repeat units of the fluorinated polyelectrolyte comprise fluorinated groups, more preferably, at least 20% of the repeat units comprise fluorinated groups.

The HFTFPCs of the present invention may comprise one polyelectrolyte or may comprise a blend of two or more polyelectrolytes in an interpenetrating network. For example, the net positively charged polyelectrolyte may comprise one positively charged polyelectrolyte or a blend of two or more net positively charged polyelectrolytes, at least one positively charged polyelectrolyte containing highly fluorinated repeat units. Alternatively, the net negatively charged polyelectrolyte may comprise one negatively charged polyelectrolyte or a blend of two or more net negatively charged polyelectrolytes, at least one negatively charged polyelectrolyte containing highly fluorinated repeat units. The HFTFPCs of the present invention may comprise a blend of two or more net positively charged and a blend of two or more net negatively charged polyelectrolytes. The blended polyelectrolytes preferably comprise at least one net positively charged polyelectrolyte which contains highly fluorinated repeat units, at least one net negatively charged polyelectrolyte which contains highly fluorinated repeat units, or both. Preferably, in such blends, at least 5% of the charged polyelectrolytes comprise highly fluorinated repeat units, and more preferably at least 20% of the polyelectrolytes in the blend comprise highly fluorinated repeat units.

In another embodiment, the HFTFPC comprises a fluorinated particle having a charge and a fluorinated polyelectrolyte having an opposite charge to form a nanocomposite of particles and polymer.

The HFTFPCs of the present invention possess specific properties that make their use attractive for a wide variety of applications. For example, films having thicknesses from about 1 nm to about 10,000 nm can readily be deposited, with the preferred thickness for a particular environment being dependent upon the particular application to which the HFTFPC is put to use. Unlike many of the highly fluorinated films which are known, the HFTFPCs of the present invention can be applied as very thin films, (e.g., less than about 1 μm).

The HFTFPCs of the present invention are hydrophobic, having water/air/surface interfacial contact angles greater than 90 degrees. Measurement of the interfacial contact angle between a water surface and coated surface is a well known method of assessing the wetting properties of water on a material (see R. J. Good, *J. Adhesion Sci. Technol.*, 12, 1269, (1992)). If the contact angle of water on a coating is low, the surface is said to be hydrophilic. If the contact angle is high, the surface is said to be hydrophobic. Surfaces with contact angles of greater than 90 degrees are particularly effective for antiwetting applications. The contact angle of water on polyelectrolyte multilayers depends on the combination of polyelectrolytes and also on which polyelectrolyte is used for the "top" layer (see for example Chen and McCarthy, *Macromolecules*, 30, 78 1997; and Yoo et al. *Macromolecules*, 31, 4309 1998, which demonstrate contact angles on non-fluorinated polyelectrolyte multilayers).

For applications in which it may be desirable, the HFTFPCs of the present invention have a low coefficient of friction. Additionally, the HFTFPCs of the present invention have a low dielectric constant, typically less than about 1.4, preferably less than about 1.35, and more preferably less than about 1.30. Also, the HFTFPCs of the present invention impart corrosion resistance when coated on the surface of Fe-based, Al-based, and Cu-based metals and alloys.

Preferred uses of the HFTFPCs are several. Preferred applications employ the special advantages of fluorinated polymers. In one embodiment of this invention, HFTFPCs are used as coatings to impart hydrophobic (antiwetting or water-repellency) character to carpet, garments, cloth, and fabric upholstery. The HFTFPCs are preferably applied to the fibers comprising carpet, garments, cloth, and fabric upholstery by alternating spraying of solutions or suspensions of charged fluorinated polymers or fluorinated polyelectrolytes. Preferable concentrations of charged fluorinated polymers are 0.01 weight % to 10 weight % and more preferably 0.1 weight % to 1 weight %. When creating a HFTFPC on carpet, garments, cloth, and fabric upholstery, a rinse step is not preferred, as this is impractical. Instead, the number of charges on positive and negative fluorinated polyelectrolytes is balanced by spraying on equal amounts of each. It is preferred, when treating carpet, garments, cloth, and fabric upholstery, to apply one coating of each fluorinated polyelectrolyte. Optionally, a suspension of charged fluorinated polymer may be substituted for one of the charged fluorinated polyelectrolytes for creation of an antiwetting coating on carpet, garments, cloth, or fabric upholstery. Preferred concentrations for the suspension of fluorinated polymer are 0.01 weight % to 10 weight % and more preferably 0.1 weight % to 1 weight %.

In another embodiment of this invention, a HFTFPC coating is applied to a leather article, such as a suede coat or shoe. The HFTFPCs are preferably applied to the leather article by alternating spraying of solutions or suspensions of charged fluorinated polymers or fluorinated polyelectrolytes. Preferable concentrations of charged fluorinated polymers are 0.01 weight % to 10 weight % and more preferably 0.1 weight % to 1 weight %. When creating a HFTFPC on leather articles a rinse step is not preferred, as this is impractical. Instead, the number of charges on positive and negative fluorinated polyelectrolytes is balanced by spraying on equal amounts of each. It is preferred, when treating leather articles, to apply multiple coatings of each fluorinated polyelectrolyte. Optionally, a suspension of charged fluorinated polymer may be substituted for one of the charged fluorinated polyelectrolytes for creation of an antiwetting coating on leather articles. Preferred concentrations for the suspension of fluorinated polymer are 0.01 weight % to 10 weight % and more preferably 0.1 weight % to 1 weight %.

In another embodiment of this invention, the antiwetting properties of HFTFPCs are employed to protect and/or seal construction materials including wood, brick, tile, concrete, stone, slate, and grout. Preventing water penetration into construction materials is generally advantageous, as it decreases the deleterious effects of weathering, degradation, decomposition, insect infestation, and mold formation. The HFTFPCs are preferably prepared on building materials by alternately spraying solutions or dispersions of positive and negative fluorinated polyelectrolytes on the material. The fluorinated polyelectrolytes are preferably applied as solutions of concentration 0.1 to 10 weight %. The first application, preferably positive polyelectrolyte, is preferably allowed to penetrate the building material for a brief period. Then the second application, preferably negative polyelectrolyte, is made. A rinse of solvent in between polyelectrolyte applications is generally not preferred, as a rinse would wash away valuable material; instead, it is preferred to make the corresponding amounts of positive and negative polyelectrolytes match on a polyelectrolyte repeat unit basis. For example, if a negative fluorinated polyelectrolyte is applied at the rate of $10^{-6}$ moles of charged polymer repeat units per square cm of building material, it is preferable to apply the positive polyelectrolyte at the rate of $10^{-6}$ moles of charged polymer repeat units per square cm of building material. When no rinse is employed, it is preferred not to add salt beyond that sufficient to aid in the dispersion of the fluorinated polyelectrolyte. The maximum concentration of salt in any case is about 0.1 M. If one of the fluorinated polyelectrolytes is dispersed in an aqueous solvent, it is preferable to apply this polyelectrolyte first and allow it to dry, then apply the polyelectrolyte dispersed or dissolved in organic solvent, because a water solution applied to an existing coating of fluorinated polyelectrolyte on building material would have trouble wetting and penetrating said existing coating. For greater protection additional layers of alternating perfluorinated polyelectrolyte coatings are preferred. In applications where environmental or health considerations are of prime importance, it is preferred to employ aqueous dispersion of fluorinated polyelectrolytes. If effectiveness of coating and completeness of the complexation reactions between positive and negative polyelectrolytes are of prime importance, it is preferred to employ organic (i.e. nonaqueous) solutions or dispersions of fluorinated polyelectrolytes. Optionally, each coat of fluorinated polymer may be applied by a brush or roller.

The examples below illustrate the water-repellant effectiveness of HFTFPCs coating the surface of a selection of building materials.

It is known by those skilled in the art that the top, or outer, layer of a polyelectrolyte layer has the most effect on surface hydrophobicity. Accordingly, in one embodiment of this invention, the initial layers 0 through n of a multilayer are prepared from nonfluorinated polyelectrolytes, preferably those listed above, and the n+1 and n+2 layers comprise fluorinated positive polyelectrolyte and fluorinated negative polyelectrolyte. The use of fluorinated polyelectrolytes in only the top layers conserves potentially costly materials.

In another embodiment of this invention, the initial layers 0 through n of a multilayer are prepared from nonfluorinated polyelectrolytes, preferably those listed below, and the n+1 layer comprises fluorinated positive polyelectrolyte, preferably PFPVP. As shown in the example, below, the contact angle of water on a PFPVP surface is higher than the contact angle on a Nafion surface. Therefore, a single layer of PFPVP is advantageously more hydrophobic than a single layer of Nafion.

It is known by those skilled in the art that surface roughness increases the water contact angle on a hydrophobic surface (see Oner and McCarthy, *Langmuir*, 16, 7777 (2000) for example). Topography of the surface may be somewhat random, or the roughness features may be arranged in a systematic or periodic manner (as described in Oner and McCarthy, *Langmuir*, 16, 7777 (2000)). The resulting surfaces have exceptionally high contact angles (greater than 150 degrees) and are termed "ultrahydrophobic." Accordingly, in one embodiment of this invention, the surface on which the HFTFPC is deposited is rough. Said roughness is introduced by patterns on the surface, or, preferably, the roughness is created by layering or adsorbing particles on the surface. If clay particles are employed they are preferably attapulgite clay. Preferably, the average spacing between roughness features on the surface, introduced to increase the contact angle, is less than about 30 micrometers. In the examples below, it is shown how attapulgite clay particles on the surface of a substrate onto which a HFTFPC is deposited increase the water contact angle on said HFTFPC.

In yet another preferred embodiment of this invention, HFTFPCs are used as dielectric materials in electronic circuits, elements, or chip packaging. Fluorinated polymers are known by those skilled in the art to possess low dielectric constants. A low dielectric constant, insulating material is advantageous because when used to space conducting circuit elements the amount of high frequency "cross talk" between circuits is minimized. In other words, the electronic, through-space inductive coupling of one conducting path with another is minimized, which is an important property of materials used in small-feature, high speed electronic circuits. Advantageously, HFTFPCs are shown in the examples below to contain very little water compared to polyelectrolyte complex films which do not comprise fluorinated polyelectrolytes. The dielectric constant of water is very high. The low water content means the dielectric constant of HFTFPCs will not be increased by the presence of adventitious water. By comparison, polyelectrolyte complexes comprising nonfluorinated polyelectrolytes, including those prepared by the multilayering method, have a strong dependence of dielectric constant on relative humidity of the environment (see Durstock and Rubner, *Langmuir*, 17, 7865 (2001)). Furthermore, the presence of ionic impurities within thin films of polyelectrolyte complex will degrade electrical contacts, as is known to those skilled in the art, and will also serve to increase the apparent dielectric constant. The fact that ionic mobility through HFTFPCs is very low (see the examples) is another advantage.

In yet another embodiment of this invention, HFTFPCs are employed as low refractive index materials for optical elements, such as fiber and waveguides. It is known by those skilled in the art that in order for light to propagate down a fiber optic or waveguide, the refractive index of the material on the surface of and in contact with the fiber optic or waveguide is preferably of lower value than the fiber optic or waveguide material itself. Under these conditions, light striking the internal surface of the fiber optic or waveguide at an angle higher than the critical (Brewster) angle will be reflected back into the fiber optic or waveguide and will propagate down the optical element. Advantageously, HFTFPCs have a lower refractive index than polyelectrolyte complex thin films comprising nonfluorinated polyelectrolytes only, which makes HFTFPCs better candidates as cladding materials for fiber optics and waveguides. Also advantageous is the fact that HFTFPCs do not absorb water, meaning that the refractive index of the cladding, and therefore the light propagating qualities of the fiber optic or the cladding, will be unaffected by changes in the relative humidity of the environment.

In yet another embodiment of this invention, HFTFPCs are employed as coatings to protect against the corrosion of metals, preferably steel. Said coatings are preferably applied using nonaqueous solutions of positive and negative fluorinated polyelectrolytes. Said polyelectrolyte solutions preferably contain 0.1 to 10 weight % of polymer and are preferably applied in an alternating manner by spraying. Optionally, a rinse may be applied between polyelectrolyte solutions. Said HFTFPCs are preferably between 10 and 1000 nm thick. Preferably, surfaces to be coated are cleaned by abrasion, preferably sand blasting. As shown in the examples, HFTFPCs have the advantageous property, relative to other thin films of polyelectrolyte complex (not comprising fluorinated polyelectrolytes), that they are particularly good at inhibiting the passage of ions. Ions, in particular chloride ion, are known to those skilled in the art to be principal active agents in the rusting process, along with water and oxygen. As seen in the examples, HFTFPCs are effective at preventing the corrosion of steel wires and steel plates immersed in, or in proximity to, salt water.

In yet another embodiment of this invention, HFTFPCs are employed as membranes in fuel cells, preferably fuel cells comprising two compartments comprising acid and separated by a proton transporting membrane operating between 0 and 95° C. HFTFPCs are preferably employed as proton exchange membranes in these fuel cells, with oxygen or air provided to one electrode and hydrogen or methanol, or some other fuel known to those skilled in the art, provided to the other electrode (for a discussion of fuel cell technology and possible combination of fuel and oxidizer see Appleby and Foulkes, *Fuel Cell Handbook*, van Norstrand Reinhold, New York, 1989). It is known to those skilled in the art that in order for polymer membranes to transport protons they must have proton transporting and exchanging sites. A further requirement is that water must be present in the proton conducting membrane. The exclusion of water by heating beyond 95° C., for example, causes the conductivity of fuel cell membranes made from Nafion (a well-known poly perfluorinated sulfonated ionomer), which are well known to those skilled in the art, to drop precipitously (see for example Appleby and Foulkes, *Fuel Cell Handbook*, van Norstrand Reinhold, New York, 1989). HFTFPCs, being a complex of polyelectrolytes, do not have many sites for the transport of small ions, as shown in the examples below. Therefore, when HFTFPCs are used as membranes in fuel cells, it is preferred that the thickness of the HFTFPC be kept as low as possible such that the resistance to proton transport is minimized, preferably below 1000 nm and more preferably below 100 nm. Preferably, because such thin films are very fragile, the HFTFPC is prepared on a porous support, preferably with pore size less than 10 micrometers. In order to introduce more proton exchange sites within the HFTFPC, it is preferred to add a small amount of perfluorinated counterion to the solutions in the fuel cell. Preferred counterions are perfluorinated carboxylic acids and perfluorinated sulfonic acids, preferably perfluorooctane sulfonic acids. These perfluorinated counterions have the advantageous effect that they enter the HFTFPC, as shown in the example below, and open up sites within the HFTFPC for the transport of small cations, such as the proton. Preferred concentrations of perfluorinated counterions added to the fuel cell compartments are between 0.01 and 1% by weight. In one particularly preferred embodiment of this invention, a HFTFPC is formed by contacting a film of Nafion by a solution of fluorinated positive polyelectrolyte. Said fluorinated positive polyelectrolyte forms a HFTFPC by complexing with the outside surface of the Nafion film. Preferred thickness for the Nafion film is 10 micrometers to 200 micrometers. A preferred fluorinated positive polyelectrolyte is a polyvinylpyridine, preferably poly(4-vinylpyridine), alkylated with a fluoroalkane, preferably 1,1,1,2,2,3,3,4,4,5,5,6,6-tridecafluoro-8-iodooctane. The preferred level of alkylation is between about 10% and about 70%. Residual unalkylated pyridines advantageously provide sites for protonation and proton exchange and transport.

In yet another embodiment of this invention HFTFPCs are employed as coatings on surfaces to reduce friction. Preferred concentrations of solutions or dispersions of charged fluorinated polymers applied to said surfaces are 0.01 weight % to 10 weight % and more preferably 0.1 weight % to 1 weight %. Preferred surfaces are those used to store high densities of information, such as a rotating disc of magnetic computer storage media, also known as a "fixed disc." Said fixed discs are known to employ a surface coating of fluorinated material to enable a magnetic read/write head to glide without friction over the surface of the disc at high speed. In accordance with this preferred application, a HFTFPC of thickness 1 nm to 100 nm on the surface of said magnetic recording medium is preferred to allow close approach of the magnetic read/write head. More preferably, the HFTFPC is of thickness 1 nm to 10 nm to allow even closer approach of the magnetic read/write head to the magnetic storage medium.

A preferred embodiment of this invention is the simultaneous use of a HFTFPC coating a magnetic material and an ultrathin film of fluorinated small molecule or oligomer on the surface of said HFTFPC. Said combination combines the advantages of having a resilient fluorinated film (the HFTFPC) in contact with the magnetic storage medium and the more fluid nature of the fluorinated small molecule or fluorinated oligomer on top of the HFTFPC. Said combination is further advantageous, as the HFTFPC is compatible with the fluorinated molecule or fluorinated oligomer. For the purposes of this invention, an oligomer is defined as an organic fluorocarbon material comprising up to twenty repeat units, at least half of said repeat units comprising at least one fluorine group. A fluorinated molecule is defined as a hydrocarbon of molecular weight up to 300 g per mole comprising at least four fluorine groups. Such fluorinated molecules may be surfactants, comprising polar and nonpolar ends. In one preferred embodiment, the fluorinated molecule on the surface of a HFTFPC comprises a charge at one end. Preferred charged fluorinated molecules are fluorinated alkanesulfonic acids and fluorinated alkanecarboxylic acids.

In yet another embodiment of this invention, the low coefficient of friction of the HFTFPC is used advantageously in the coating of metals for reduced wear. Preferred embodiments are as coatings where metal contacts metal. Traditional lubrication of these wear surfaces is accomplished by a lubricant such as a hydrocarbon based oil. Internal combustion motors are mechanical systems having potentially severe metal wear. Oil is added to internal combustion engines, and their parts and drive chains, for lubrication. Wear between pistons and cylinders, for example, is effectively minimized by the addition of motor oil. In a preferred embodiment, a HFTFPC is formed as a coating on two contacting metal surfaces. The coating may be formed on the metal surfaces by the layer-by-layer deposition technique. Preferably, the coating is formed by the addition of a suspension of particles of complexed fluorinated polyelectrolyte to the oil. During normal use, these particles adhere to the metal surface and form a coating. The particles are spread and adhere to the metal under shear forces. Preferably, the oil also comprises particles of fluorinated polymer, such as Teflon™. The complexed fluorinated polyelectrolyte particles adhere to the surface to form a HFTFPC, the particles of fluorinated polymer then adhere to the HFTFPC. Advantageously, the HFTCPC enhances the adhesion of the fluorinated polymer to the metal surfaces. Particles of complexed fluorinated polyelectrolyte are preferably made by mixing a solution of positive fluorinated polyelectrolyte and a solution of negative fluorinated polyelectrolyte. The resulting precipitate is then filtered or decanted. An excess of positive fluorinated polyelectrolyte is preferred, so that the particles of complexed fluorinated polyelectrolytes bear a positive charge. The positive charge is attracted to the metal surface, which usually bears a negative oxide coating. Smaller particles are preferred, and are prepared by using dilute solutions or by adding a surfactant to assist in dispersing the particles. Preferably, said surfactant is fluorinated. The preferred particle size of complexed fluorinated polyelectrolyte is 0.01 to 100 micrometers. The preferred concentrations of complexed fluorinated polyelectrolyte particles in the motor oil is about 0.001 weight % to 1.0 weight %; more preferred concentrations are about 0.01 weight % to 0.1 weight %.

A material that emits light in response to the passage of an electric current through said material is known as an electroluminescent material. Such electroluminescent materials are well known in the art. A review by Friend and Greenham (see Chapter 29 in *Handbook of Conducting Polymers*, T. A Skotheim, R. L. Elsenbaumer, J. R. Reynolds, Editors, Marcel Dekker, New York, 1998) describes electroluminescent materials. In another preferred embodiment of this invention a HFTFPC is applied to an electrode surface to enhance the efficiency of charge injection from said electrode into an electroluminescent material. Preferably, the electroluminescent material is a conjugated polymer. The HFTFPC is preferably applied as a film in contact with an electrode, or as part of a series of layers coating an electrode. Preferred electrodes comprise aluminum or calcium or doped semiconductors, preferably indium doped tin oxide. The thickness of the HFTFPC is preferably 1 nm to 100 nm, more preferably about 1 nm to about 10 nm. While passage of positive charge current (holes) or negative charge current (electrons) through a film of HFTFPC is possible, especially if it has a preferred thickness of less than about 10 nm, due to the electron withdrawing nature of the fluorine groups, the preferred application is as a coating to enhance the efficiency of electron charge injection. The low water content of HFTFPC is advantageous in these applications, as the presence of water is known to degrade electrical contacts, especially in the presence of high electrical fields. Low water content and protection against corrosion are both advantageous features illustrated by the examples below.

A. Polyelectrolytes for Multilayer Films

The oppositely charged polymers (i.e., polyelectrolytes) used to form the films are water and/or organic soluble and comprise one or more monomer repeat units that are positively or negatively charged. The polyelectrolytes used in the present invention may be copolymers that have a combination of charged and/or neutral monomers (e.g., positive and neutral; negative and neutral; positive and negative; or positive, negative, and neutral). Regardless of the exact combination of charged and neutral monomers, a polyelectrolyte of the present invention is predominantly positively charged or predominantly negatively charged and hereinafter is referred to as a "positively-charged polyelectrolyte" or a "negatively-charged polyelectrolyte," respectively.

Alternatively, the polyelectrolytes can be described in terms of the average charge per repeat unit in a polymer chain. For example, a copolymer composed of 100 neutral and 300 positively charged repeat units has an average charge of 0.75 (3 out of 4 units, on average, are positively charged). As another example, a polymer that has 100 neutral, 100 negatively charged, and 300 positively charged repeat units would have an average charge of 0.4 (100 negatively charged units cancel 100 positively charged units leaving 200 positively charged units out of a total of 500 units). Thus, a positively-charged polyelectrolyte has an average charge per repeat unit between 0 and 1 and a negatively-charged polyelectrolyte has an average charge per repeat unit between 0 and −1. An example of a positively-charged copolymer is PDADMA-co-PAC (i.e., poly(diallyldimethylammonium chloride) and polyacrylamide copolymer) in which the PDADMA units have a charge of 1 and the PAC units are neutral so the average charge per repeat unit is less than 1.

Some polyelectrolytes comprise equal numbers of positive and negative repeat units distributed throughout the polymer in a random, alternating, or block sequence. These polyelectrolytes are termed "amphiphilic" polyelectrolytes. For examples, a polyelectrolyte molecule may comprise 100 randomly distributed styrene sulfonate repeat units (negative) and 100 diallyldimethylammonium chloride repeat units (positive), said molecule having a net charge of zero.

Some polyelectrolytes comprise a repeat unit that has both a negative and positive charge. Such repeat units are termed "zwitterionic" and the polyelectrolyte is termed a "zwitterionic polyelectrolyte." Though zwitterionic repeat units contribute equal number of positive and negative repeat units, the zwitterionic group is still solvated and relatively hydrophilic. An example of a zwitterionic repeat unit is 3-[2-(acrylamido)-ethyldimethyl ammonio]propane sulfonate, AEDAPS. Preferred compositions of polyelectrolytes comprising zwitterionic repeat units also comprise between about 10% and about 90% non-zwitterionic charged repeat units.

The charges on a polyelectrolyte may be derived directly from the monomer units or they may be introduced by chemical reactions on a precursor polymer. For example, PDADMA is made by polymerizing diallyldimethylammonium chloride, a positively charged water soluble vinyl monomer. PDADMA-co-PAC is made by the polymerization of a mixture of diallyldimethylammonium chloride and acrylamide (a neutral monomer which remains neutral in the polymer). Poly(styrenesulfonic acid) is often made by the sulfonation of neutral polystyrene. Poly(styrenesulfonic acid) can also be made by polymerizing the negatively charged styrene sulfonate monomer. The chemical modification of precursor polymers to produce charged polymers may be incomplete and typically result in an average charge per repeat unit that is less than 1. For example, if only about 80% of the styrene repeat units of polystyrene are sulfonated, the resulting poly(styrenesulfonic acid) has an average charge per repeat unit of about −0.8.

Examples of negatively-charged synthetic polyelectrolytes include polyelectrolytes comprising a sulfonate group ($-SO_3^-$), such as poly(styrenesulfonic acid) (PSS), poly(2-acrylamido-2-methyl-1-propane sulfonic acid) (PAMPS), sulfonated poly(ether ether ketone) (SPEEK), poly(ethylenesulfonic acid), poly(methacryloxyethylsulfonic acid), their salts, and copolymers thereof; and polycarboxylates such as poly(acrylic acid) (PAA) and poly(methacrylic acid), poly (phosphonates), and poly(phosphates).

Examples of a positively-charged synthetic polyelectrolyte include polyelectrolytes comprising a quaternary ammonium group, such as poly(diallyldimethylammonium chloride) (PDADMA), poly(vinylbenzyltrimethylammonium) (PVBTA), ionenes, poly(acryloxyethyltrimethyl ammonium chloride), poly(methacryloxy(2-hydroxy)propyltrimethyl ammonium chloride), and copolymers thereof; polyelectrolytes comprising a pyridinium group such as poly(N-methylvinylpyridinium) (PMVP), including poly(N-methyl-2-vinylpyridinium) (PM2VP), other poly(N-alkylvinylpyridines), and copolymers thereof; polyelectrolytes comprising a phosphonium or sulfonium group, and protonated polyamines such as poly(allylamine-hydrochloride) (PAH) and polyethyleneimine (PEI).

Some synthetic polyelectrolytes used in accordance with the present invention generally become charged at certain pH values. For example, poly(acrylic acids) and derivatives begin to take on a negative charge within the range of about pH 4 to about 6 and are negatively charged at higher pH levels. Below this transition pH range, however, poly(acrylic acids) are protonated (i.e., uncharged). Similarly, polyamines and derivative thereof take on a positive charge if the pH of the solution is below their $pK_a$. As such, and in accordance with the present invention, the pH of a polyelectrolyte solution may be adjusted by the addition of an acid and/or base in order to attain, maintain, and/or adjust the electrical charge of a polyelectrolyte at the surface of, or within, a polyelectrolyte multilayer.

The state of ionization, or average charge per repeat unit, for polyelectrolytes bearing pH sensitive groups depends on the pH of the solution. For example, a polyelectrolyte comprising 100 pH insensitive positively charged units, such as DADMA, and 30 pH sensitive negatively charged units, such as acrylic acid, AA, will have a net charge of +100 at low pH (where the AA units are neutral) and an average of +100/130 charge per repeat unit; and a net charge of +70 at high pH (where 30 ionized AA units cancel out 30 of the positive charges) and an average of +70/130 charge per repeat unit. The different monomer units may be arranged randomly along the polymer chain ("random" copolymer) or they may exist as blocks ("block" copolymer). The average charge per repeat unit is also known as the "charge density."

The molecular weight (number average) of synthetic polyelectrolyte molecules is typically about 1,000 to about 5,000,000 grams/mole, preferably about 10,000 to about 1,000,000 grams/mole. The molecular weight of naturally occurring polyelectrolyte molecules (i.e., biomacromolecules), however, can reach as high as 10,000,000 grams/mole. The polyelectrolyte typically comprises about 0.01% to about 40% by weight of a polyelectrolyte solution, and preferably about 0.1% to about 10% by weight.

The polyelectrolytes of the present invention comprise polymer chain backbone units and pendant groups from the polymer chain backbone units. Polymer chain backbone units for use in HFTFPCs of the present invention are preferably polyolefinic groups (e.g., vinylic groups, allylic groups, and longer carbon chain olefins). Other polymer chain backbones units which may be applicable include polyamines, polyamides, polyethers, polyesters, polyimides, polysulfones, polyaryls, polyphenols, polyaramides, and combinations thereof. Fluorine atoms may be present on the polymer chain backbone units, the pendant groups, or both. In one embodiment, at least one fluorine atom is present on the polymer chain backbone units. Preferably, fluorine atoms are present on the pendant groups.

Many of the foregoing polymers/polyelectrolytes, such as PDADMA and PEI, exhibit some degree of branching. Branching may occur at random or at regular locations along the backbone of the polymer. For example, for the polymer repeat unit PDADMA, branching may occur due to the presence of two allylic groups on the quaternary nitrogen. For PEI, branching may occur at secondary nitrogen groups along the polymer backbone. Branching may also occur from a central point and in such a case the polymer is referred to as a "star" polymer, if generally linear strands of polymer emanate from the central point. If, however, branching continues to propagate away from the central point, the polymer is referred to as a "dendritic" polymer. Branched polyelectrolytes, including star polymers, comb polymers, graft polymers, and dendritic polymers, are also suitable for purposes of this invention.

Many of the foregoing polyelectrolytes have a very low toxicity. In fact, poly(diallyldimethylammonium chloride), poly(2-acrylamido-2-methyl-1-propane sulfonic acid), and their copolymers are used in the personal care industry, e.g., in shampoos. Also, because the polyelectrolytes used in the method of the present invention are synthetic or synthetically modified natural polymers, their properties (e.g., charge density, viscosity, water solubility and response to pH) may be tailored by adjusting their composition.

By definition, a polyelectrolyte solution comprises a solvent. An appropriate solvent is one in which the selected polyelectrolyte is soluble. Thus, the appropriate solvent is dependent upon whether the polyelectrolyte is considered to be hydrophobic or hydrophilic. A hydrophobic polymer displays a less favorable interaction energy with water than a hydrophilic polymer. While a hydrophilic polymer is water soluble, a hydrophobic polymer may only be sparingly soluble in water, or, more likely, insoluble in water. Likewise, a hydrophobic polymer is more likely to be soluble in organic solvents than a hydrophilic polymer. In general, the higher the carbon to charge ratio of the polymer, the more hydrophobic it tends to be. For example, polyvinyl pyridine alkylated with a methyl group (PNMVP) is considered to be hydrophilic, whereas polyvinyl pyridine alkylated with an octyl group (PNOVP) is considered to be hydrophobic. Thus, water is preferably used as the solvent for hydrophilic polyelectrolytes and organic solvents such as ethanol, methanol, dimethylformamide, acetonitrile, carbon tetrachloride, and methylene chloride are preferably used for hydrophobic polyelectrolytes. Since some solvents are known to be incompatible with some plastic materials, preferred solvents for depositing polyelectrolyte complex thin films on plastics are water and alcohols.

Examples of polyelectrolytes that are soluble in water include poly(styrenesulfonic acid), poly(2-acrylamido-2-methyl-1-propane sulfonic acid), sulfonated lignin, poly(ethylenesulfonic acid), poly(methacryloxyethylsulfonic acid), poly(acrylic acids), poly(methacrylic acids), their salts, and copolymers thereof; as well as poly(diallyldimethylammonium chloride), poly(vinylbenzyltrimethylammonium), ionenes, poly(acryloxyethyltrimethyl ammonium chloride), poly(methacryloxy(2-hydroxy)propyltrimethyl ammonium chloride), and copolymers thereof; and polyelectrolytes comprising a pyridinium group, such as, poly(N-methylvinylpyridium), and protonated polyamines, such as, poly(allylamine hydrochloride) and poly(ethyleneimine).

Examples of polyelectrolytes that are soluble in non-aqueous solvents, such as ethanol, methanol, dimethylformamide, acetonitrile, carbon tetrachloride, and methylene chloride include poly(N-alkylvinylpyridines), and copolymers thereof in which the alkyl group is longer than about 4 carbon atoms.

Other examples of polyelectrolytes soluble in organic solvents include poly(styrenesulfonic acid), poly(diallyldimethylammonium chloride), poly(N-methylvinylpyridinium), and poly(ethyleneimine) where the small polymer counterion, such as chloride or bromide, has been replaced by a large hydrophobic counterion such as tetrabutyl ammonium, tetraethyl ammonium, iodine, hexafluorophosphate, tetrafluoroborate, or trifluoromethane sulfonate.

The HFTFPCs using copolyelectrolytes may comprise fluorinated and non-fluorinated monomers. Said monomers may be disposed in a random, block, or graft fashion on the backbone of said copolyelectrolytes. Preferred fluorinated copolyelectrolytes comprise charged non-fluorinated with non-charged fluorinated repeat units, or charged fluorinated with noncharged nonfluorinated repeat units. Other preferred fluorinated polyelectrolytes comprise charged fluorinated repeat units with charged nonfluorinated repeat units.

The HFTFPCs may comprise net negatively charged polyelectrolytes comprising polymer repeat units with at least two fluorine atoms, net positively charged polyelectrolytes comprising polymer repeat units with at least two fluorine atoms, or both net negatively charged polyelectrolytes comprising polymer repeat units with at least two fluorine atoms and net positively charged polyelectrolytes comprising polymer repeat units with at least two fluorine atoms. Preferably, the thin films of polyelectrolyte complex comprise at least one negative polyelectrolyte comprising polymer repeat units with at least two fluorine atoms, and at least one positive polyelectrolyte comprising polymer repeat units with at least two fluorine atoms. Mole percentages of fluorinated repeat units on fluorinated copolyelectrolytes are preferably from 10% to 95%, more preferably 20% to 95%.

A range of repeat units may be included in the predominantly positively charged polymer, the predominantly negatively charged polymer, or both. In one embodiment, the repeat unit is a positively charged repeat unit comprising pendant groups selected from the group consisting a quaternary nitrogen atom ($N^+$), a sulfonium ($S^+$) atom, or a phosphonium atom ($P^+$). Thus, for example, the quaternary nitrogen may be part of a quaternary ammonium moiety ($—N^+R_aR_bR_c$ wherein $R_a$, $R_b$, and $R_c$ are independently alkyl, aryl, or mixed alkyl and aryl), a pyridinium moiety, a bipyridinium moiety, or an imidazolium moiety, the sulfonium atom may be part of a sulfonium moiety ($—S^+R_dR_e$ wherein $R_d$ and $R_e$ are independently alkyl, aryl, or mixed alkyl and aryl) and the phosphonium atom may be part of a phosphonium moiety ($—P^+R_fR_gR_h$ wherein $R_f$, $R_g$, and $R_h$ are independently alkyl, aryl, or mixed alkyl and aryl). In another embodiment, the repeat unit is a negatively charged repeat unit comprising pendant groups selected from the group consisting of sulfonates ($—SO_3^-$), phosphates ($—OPO_3^-$), or sulfates ($—SO_4^-$).

For illustrative purposes, certain of these moieties are shown as pendant groups from a vinyl polymer:

Vinyl Polymer Backbone Unit

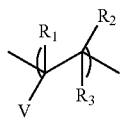

wherein $R_1$, $R_2$, and $R_3$ are each independently: $—(CH_2)_nH$ where n=0 to 12, $—F$, and $—(CH_xF_{2-x})_nF$ where n=0 to 12, x=0, 1, or 2 and V is a pendant group selected from among the following:

Fluorinated hydrocarbons having the formula: $—(CH_2)_p(CF_2)_qF$, $—(CH_2)_p(CF_2)_qCOOH$, $—(CH_2)_p(CF_2)_qOPO_3^-$, $—(CH_2)_p(CF_2)_qSO_3^-$, $—(CH_2)_p(CF_2)_qOSO_3^-$, $—O(CH_2)_p(CF_2)_qF$, $—O(CH_2)_p(CF_2)_qSO_3^-$ and where p=0 to 6 and q=1 to 21;

Fluorinated Amides having the formulae: $—CONR_4$ where $R_4$=$—(CH_2)_p(CF_2)_qF$, $—(CH_2)_p(CF_2)_qCOOH$, $—(CH_2)_p(CF_2)_qOPO_3^-$, $—(CH_2)_p(CF_2)$, $—SO_3^-$, $—(CH_2)_p(CF_2)_qOSO_3^-$ and where p=0 to 6 and q=1 to 21;

Fluorinated Esters having the formulae: $—COOR_5$ where $R_5$=$—(CH_2)_p(CF_2)_qF$, $—(CH_2)_p(CF_2)_qCOOH$, $—(CH_2)_p(CF_2)_qOPO_3^-$, $—(CH_2)_p(CF_2)_qSO_3^-$, $—(CH_2)_p(CF_2)_qOSO_3^-$ and where p=0 to 6 and q=1 to 21;

Fluorinated Phenyl groups having the formulae:

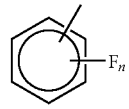

where n=2 to 5; or

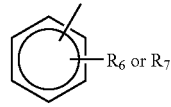

where $R_6$=$—(CH_2)_p(CF_2)_qF$ and $R_7$=$—O(CH_2)_p(CF_2)—F$ and where p=0 to 6 and q=1 to 21;

Fluorinated Pyridiniums having the formulae:

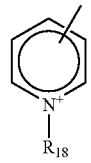

where $R_{18}$=$—(CH_2)_p(CF_2)_qF$ and where p=0 to 6 and q=1 to 21;

Fluorinated Imidazoliums having the formulae:

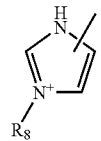

where $R_8$=$—(CH_2)_p(CF_2)_qF$ and where p=0 to 6 and q=1 to 21;

Fluorinated quaternary nitrogens having the formulae: $—N^+R_9R_{10}R_{11}$ where $R_9$, $R_{10}$, and $R_{11}$ are each independently: $—(CH_2)_p(CF_2)_qF$ where p=0 to 6 and q=1 to 21 or -arylF$_z$ where z=2 to 8;

Fluorinated Sulfoniums having the formulae: $—S^+R_{12}R_{13}$ where $R_{12}$ and $R_{13}$ are each independently: $—(CH_2)_p(CF_2)_qF$ where p=0 to 6 and q=1 to 21 or -arylF$_1$, where z=2 to 8; and Fluorinated Phosphoniums having the formulae:
—P⁺R$_{14}$R$_{15}$R$_{16}$ where R$_{14}$, R$_{15}$, and R$_{16}$ are each independently: —(CH$_2$)$_p$(CF$_2$)$_q$F where p=0 to 6 and q=1 to 21 or -arylF$_z$ where z=2 to 8.

For illustrative purposes, certain of these moieties are shown as pendant groups from an allyl polymer (e.g., PDADMA):

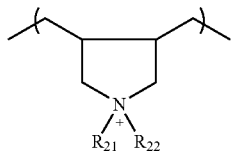

where R$_{21}$ and R$_{22}$ are each independently: —(CH$_2$)$_p$(CF$_2$)$_q$F where p=0 to 6 and q=1 to 21.

Positive fluorinated polyelectrolytes may be prepared by the alkylation of a nitrogen group, a sulfur group, or a phosphorus group by an alkylating molecule comprising two or more fluorine atoms. Said alkylating molecule also comprises a group that may be displaced on reaction (a "leaving group") that is well known to those skilled in the art. Examples of preferred leaving groups are chloride, bromide, iodide, and toluene sulfonate. Preferred nitrogen-containing groups on polymers to be alkylated are the pyridine group, imidazoles, and primary, secondary, or tertiary amines. Advantageously, alkylation often proceeds with the simultaneous creation of a positive charge. For efficiency of alkylation, preferred fluorinated hydrocarbons have one or two carbons next to the leaving groups that do not bear fluorines.

Preferably, fluorinated copolyelectrolytes comprising both charged fluorinated groups and charged unfluorinated groups are formed by the alkylation of residual nitrogen groups, sulfur groups, or phosphorous groups that were not fluorinated by the fluorinated alkylating agent. Alkylation reactions with fluorinated molecules are incomplete, typically reaching yields of less than 100%, typically about 50%. As a result, a fraction of the nitrogen, sulfur, or phosphorous groups are positively charged and comprise fluorinated hydrocarbons, while the remaining fraction is uncharged. Advantageously, the degree of charge can be controlled and increased by further alkylating the residual nitrogen groups, preferably with saturated non-fluorinated hydrocarbons comprising a leaving group as is known to those skilled in the art. Preferably, alkylation with the fluorinated molecules occurs before alkylation with the saturated hydrocarbons. Fluorinated copolyelectrolytes are preferably made by post-polymerization reactions on polymers, such as alkylation, or by polymerization of fluorinated monomers or mixtures of fluorinated monomers.

Preferred uncharged fluorinated monomers include fluorovinyl ethers, such as CF$_2$=CF(OC$_2$F$_4$)$_n$—R where n is from 1 to 12 and R is a hydroxyl; alkoxy; aryl; or alkyl group, fluorinated styrenes, fluorinated olefins, vinylperfluoroesters, and vinylperfluoracrylates.

Preferred anionic fluorinated polyelectrolytes comprise the sulfonate group. Preferred anionic fluorinated polyelectrolytes comprising the sulfonate group are Nafion™ and sulfonated perfluorinated alkylvinyl vinyl ethers. Table I below depicts the names and structures of fluorinated repeat units which may be incorporated in the HFTFPCs of the present invention.

TABLE I

Fluorinated Polyelectrolyte Repeat Units for Building HFTFPCs

| Name | Structure |
|---|---|
| 4-vinyl-trideca-fluoro-octyl pyridinium iodide-co-4-vinyl pyridine (PFPVP) | (structure shown) M is a mole fraction typically from about 0.1 to about 1.0, preferably from about 0.3 to about 0.8 |
| NAFION | (structure shown) Where X is from about 6 to about 10, Y is about 1 and Z is from about 1 to about 3 |

Preferred charged nonfluorinated polyelectrolyte repeat units include sulfonates, styrenesulfonates, 2-acrylamido-2-methyl-1-propane sulfonic acid, ethylenesulfonic acid, methacryloxyethylsulfonic acid, sulfonated ether ether ketone, diallyldialkyllammonium, vinylbenzyltrimethylammonium, ionenes, acryloxyethyltrimethyl ammonium chloride, methacryloxy(2-hydroxy)propyltrimethyl ammonium, N-methylvinylpyridinium, other N-alkylvinyl pyridiniums, N-aryl vinyl pyridiniums, alkyl- or aryl imidazolium, carboxylates such as acrylic acid and methacrylic acid, phosphates, protonated pyridines, protonated imidazoles, phosphates, phosphonates, sulfonium, phosphonium, and protonated primary, secondary, or tertiary amines. Table II below depicts the names and structures of repeat units which may be incorporated as uncharged, charged, or fluorinated repeat units in the polyelectrolytes for use in building the HFTFPCs of the present invention.

TABLE II

Charged Nonfluorinated Repeat Units for Building HFTFPCs

| Name of Base Structure | Unalkylated Repeat Unit | Fluorinated Alkylated Repeat Unit | Unfluorinated Alkylated Repeat Unit |
|---|---|---|---|
| Diallyl ammonium (PDADMA) | $X_1 = -(CH_2)_n CH_3$<br>$n = 0$ to $18$ | $X_2, X_3 = -(CH_2)_p (CF_2)_q F$<br>$p = 0$ to $6$<br>$q = 1-21$ | $X_4, X_5 = -(CH_2)_n CH_3$<br>$n = 0$ to $18$ |
| Styrene sulfonic acid (PSS) | | | |
| Allyl amine (PAH) | $X_6, X_7 = $ H or $-(CH_2)_n CH_3$<br>$n = 0$ to $18$ | $X_8, X_9, X_{10} = $<br>$-(CH_2)_p (CF_2)_q F$<br>$p = 0$ to $6$<br>$q = 1-21$ | $X_{11}, X_{12}, X_{13} = $ H or $-(CH_2)_n CH_3$<br>$n = 0$ to $18$ |
| Vinyl pyridine (PVP) | | $X_{14} = -(CH_2)_p (CF_2)_q F$<br>$p = 0$ to $6$<br>$q = 1-21$ | $X_{15} = -(CH_2)_n CH_3$<br>$n = 0$ to $18$ |
| Dialkyl amino Ethyl acrylamido | $X_{16}, X_{17} = $ H or $-(CH_2)_n CH_3$<br>$n = 0$ to $18$ | $X_{18}, X_{19}, X_{20} = $<br>$-(CH_2)_p (CF_2)_q F$<br>$p = 0$ to $6$<br>$q = 1-21$ | $X_{21}, X_{22}, X_{23} = $ H or $-(CH_2)_n CH_3$<br>$n = 0$ to $18$ |

In some applications, it is preferable to construct the polyelectrolytes as block co-polymers comprising for example, a block of hydrophobic repeat units and a block of hydrophilic repeat units. For another example, a co-polymer may comprise a diblock, a triblock, or more blocks having both hydrophobic and hydrophilic blocks. An HFTFPC having such block co-polymers may organize itself into micellar units. The hydrophobic block may comprise the highly fluorinated repeat units shown above. The hydrophilic block may comprise hydrophilic neutral repeat units such as zwitterionic repeat units and hydrophilic uncharged repeat units.

In one embodiment of this invention, HFTFPCs also comprise zwitterionic functional groups. It has been found that polymers comprising zwitterionic functional groups alone do not form polyelectrolyte complexes by the layer-by-layer technique if they are employed under conditions that maintain their zwitterionic character. This is because the charges on zwitterionic groups do not exhibit intermolecular interactions. Therefore, preferred polymers comprising zwitterionic groups also comprise additional groups capable of intermolecular interactions, such as hydrogen bonding or ion pairing. More preferably, polyelectrolytes comprising zwitterionic groups also comprise charged groups that are not zwitterionic. Zwitterionic groups are present on polyelectrolytes as blocks or randomly dispersed throughout the polymer chain, preferably as blocks. Preferably, polyelectrolytes comprise between about 1% and about 90% zwitterions units, and more preferably said polyelectrolyte comprises between about 10% and about 70% zwitterionic units. Preferred compositions of polyelectrolytes comprising zwitterionic repeat units also comprise between about 10% and about 90% non-zwitterionic charged repeat units.

Examples of zwitterionic repeat units include N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulfopropyl)-ammonium betaine, N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl)dimethylammonio]ethyl 2-methyl phosphate, 2-(acryloyloxyethyl)-2'-(trimethylammonium)ethyl phosphate, [(2-acryloylethyl)dimethylammonio]methyl phosphonic acid, 2-methacryloyloxyethyl phosphorylcholine (MPC), 2-[(3-acrylamidopropyl)dimethylammonio]ethyl 2'-isopropyl phosphate (AAPI), 1-vinyl-3-(3-sulfopropyl)imidazolium hydroxide, (2-acryloxyethyl)carboxymethyl methylsulfonium chloride, 1-(3-sulfopropyl)-2-vinylpyridinium betaine, N-(4-sulfobutyl)-N-methyl-N,N-diallylamine ammonium betaine (MDABS), N,N-diallyl-N-methyl-N-(2-sulfoethyl)ammonium betaine, N,N-dimethyl-N-(3-methacrylamidopropyl)-N-(3-sulfopropyl)ammonium betaine, N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-methacryloyloxyethyl-N-(3-sulfopropyl)-ammonium betaine, and N,N-dimethyl-N-(3-methacrylamidopropyl)-N-(3-sulfopropyl)ammonium betaine. Preferred zwitterionic repeat units are poly(3-[2-(acrylamido)-ethyldimethyl ammonio] propane sulfonate) (PAEDAPS) and poly(N-propane sulfonate-2-vinyl pyridine) (P2PSVP). The structures of exemplary zwitterions are shown in Table III.

TABLE III

Zwitterionic Repeat Units for Building HFTFPCs

| Name | Structure |
|---|---|
| 3-[2-(acrylamido)-ethyldimethyl ammonio] propane sulfonate (AEDAPS) | |
| N-propane sulfonate-2-vinyl pyridine (2PSVP) | |

Optionally, the polyelectrolytes comprise an uncharged repeat unit that is preferably hydrophilic. Preferred uncharged hydrophilic repeat units are acrylamide, vinyl pyrrolidone, ethylene oxide, and vinyl caprolactam. The structures of exemplary uncharged repeat units are shown in Table IV.

TABLE IV

Uncharged Repeat Units for use in PEMUs

| Name | Structure |
|---|---|
| Acrylamide | |
| Vinylpyrrolidone | |
| Ethylene Oxide | |
| Vinylcaprolactam | |

To assist in maintaining physical integrity of the polyelectrolyte thin film, in one preferred embodiment a small amount of chemical crosslinking is introduced into the film. Crosslinking is preferably accomplished by including difunctional monomers in the polyelectrolytes comprising the thin film. For example, a divinyl repeat unit added to the polymerization reaction will be incorporated into two polyelectrolyte chains, giving a crosslink at the connection point. Alternatively, a polyelectrolyte film may be treated with a difunctional crosslinking agent. A preferred crosslinking agent is a dihalogenated compound, such as an aromatic or aliphatic dibromide, which is able to alkylate residual unalkylated units on two adjoining polyelectrolyte chains. Another preferred method of crosslinking a formed polyelectrolyte thin film is heat treatment. For example, Dai et al. (*Langmuir,* 17, 931 (2001)) disclose a method of forming amide crosslinks by heating a polyelectrolyte multilayer comprising amine and carboxylic acid groups. Yet another preferred method of introducing crosslinking, disclosed by Kozlovskaya et al. (*Macromolecules,* 36, 8590 (2003)) is by the addition of a carbodiimide, which activates chemical crosslinking. The level of crosslinking is preferably 0.01% to 50%, and more preferably 0.1% to 10%.

B. Additives for Use in Building HFTFPCs

The HFTFPCs of the present invention may be built by incorporating additives in the polyelectrolyte solutions which may affect the thin film mechanical properties. Optionally, the polyelectrolyte solutions may comprise one or more "salts." A "salt" is defined as a soluble, ionic, inorganic compound that dissociates to stable ions (e.g., sodium chloride). A salt is included in the polyelectrolyte solutions to control the thickness of the adsorbed layers. More specifically, including a salt increases the thickness of the adsorbed polyelectrolyte layer. In general, increasing the salt concentration increases the thickness of the layer for a given spray coverage and contact time. This phenomenon is limited, however, by the fact that upon reaching a sufficient salt concentration, multilayers tend to dissociate. Typically, the amount of salt added to the polyelectrolyte solution is about 10% by weight or less.

Both dip coating and spraying permit a wide variety of additives to be incorporated into a film as it is formed. Additives that may be incorporated into polyelectrolyte multilayers include inorganic materials such as metallic oxide particles (e.g., silicon dioxide, aluminum oxide, titanium dioxide, iron oxide, zirconium oxide, and vanadium oxide) and clay minerals (e.g., hectorite, kaolin, laponite, montmorillonite, and attapulgite). These particles typically range in size from about 1 nanometer to about 10 micrometers. For example, nanoparticles of zirconium oxide added to a polyelectrolyte solution or complex solution tend to improve the abrasion resistance of the deposited film. See Rosidian et al., *Ionic Self-assembly of Ultra Hard ZrO$_2$/polymernanocomposite Films,* Adv. Mater. 10, 1087-1091. Other additives include carbon fibers and carbon nanotubes (having a diameter less than 100 nanometer and an aspect ratio (length to width) of at least 10:1). Optionally, charged Teflon™ particles may be incorporated into the thin films. Typically, Teflon™ particles are charge neutral, but surfactants may be added onto the surface of the particles to impart a charge which may be positive or negative depending upon the surfactant employed.

C. Methods of Deposition

While this invention employs polyelectrolyte complex thin films, a preferred method of depositing said complex is by the alternating layer-by-layer deposition method. The preferred concentration for solutions comprising polyelectrolytes to be deposited is in the range 0.01 weight % to 10 weight %, and preferably 0.1 weight % to 1 weight %. The preferred method of alternating exposure of the substrate or material to be coated is by alternate immersion in polyelectrolyte solutions, or alternate spraying of polyelectrolyte solutions.

The alternating polyelectrolyte layering method, however, does not generally result in a layered morphology of the polymers within the film. Rather, the polymeric components interdiffuse and mix on a molecular level upon incorporation into the thin film. See Lösche et al., *Macromolecules* 31, 8893 (1998). Thus, the polymeric components form a true molecular blend, referred to as a "polyelectrolyte complex," with intimate contact between polymers driven by the multiple electrostatic complexation between positive and negative polymer segments. The complexed polyelectrolyte within the film has similar morphology as a polyelectrolyte complex formed by mixing solutions of positive and negative polyelectrolyte. It is also known that although there is extensive intermingling of neighboring layers over a range of 4-6 nominal layers, it is possible to obtain actual layers of different composition, or strata, by interspersing several layers made from one pair of polyelectrolytes by several layers made from a different pair. See Lösche et al., *Macromolecules* 31, 8893 (1998). For example, if polymers A and C are positively charged and polymers B and D are negatively charged, about 3 or 4 pairs of A/B layers followed by about 3 or 4 pairs of A/D or C/D layers will produce two strata of distinct composition.

Alternatively, the thin film coating may be applied to a surface using a pre-formed polyelectrolyte complex. See Michaels, *Polyelectrolyte Complexes,* Ind. Eng. Chem. 57, 32-40 (1965) and Michaels (U.S. Pat. No. 3,467,604). This is accomplished by mixing the oppositely-charged polyelectrolytes to form a polyelectrolyte complex precipitate which is then dissolved or re-suspended in a suitable solvent/liquid to form a polyelectrolyte complex solution/dispersion. The polyelectrolyte complex solution/dispersion is then applied to the substrate surface and the solvent/liquid is evaporated, leaving behind a film comprising the polyelectrolyte complex. To aid in dissolution or dispersion of the complex, both a salt, such as sodium bromide, and an organic solvent, such as acetone are added to the solution comprising the precipitated complex. It is known that the material obtained by layering two polyelectrolytes is substantially the same as material obtained by mixing and precipitating said polymers to form a polyelectrolyte complex.

In one embodiment of this invention, the polyelectrolyte complex is formed on a polymer or plastic surface. Polyelectrolyte complexes, especially those formed by the layer-by-layer alternating deposition technique, are known by those skilled in the art to adhere to plastic materials. For example, Chen and McCarthy (*Macromolecules,* 30, 78 (1997) describe the layer-by-layer deposition of polyelectrolyte complex on poly(ethylene terephthalate). Even fluorinated polymers, such as Dupont's Teflon™, are known to be coated by polyelectrolyte complex using the layer-by-layer technique (see Hsieh et al. *Macromolecules,* 30, 8453 (1997). Barker et al. (*Anal. Chem.,* 72, 5925 (2000)) (see also Locascio et al. U.S. Pat. Pub. No. 2002/0053514) have disclosed the layer-by-layer deposition of polyelectrolytes on plastic microfluidic channels. Thus, preferred substrates on which HFTFPCs may be formed and coated with polyelectrolyte complex include polycarbonate, poly(methyl methacrylate), polystyrene, poly(ethylene terephthalate), polysulfone, or polyamide, with the proviso that solvents used to process the HFTFPC (fluorinated polyelectrolyte complex thin film) does not attack the substrate on which the thin film of complex is being formed.

For fast throughput and coating of surfaces, one method of applying the polyelectrolyte complex is by spraying a solution, suspension, or solutions of polyelectrolytes onto said surfaces. For example, a solution may comprise both a positively charged fluorinated polyelectrolyte and a negatively charged fluorinated polyelectrolyte, and the HFTFPC may be applied as a pre-formed complex, as in the Michaels coating method. Alternatively, the HFTFPCs of the present invention may be sprayed onto a substrate using two solutions, one solution comprising a positively charged fluorinated polyelectrolyte and the other solution comprising a negatively charged fluorinated polyelectrolytes. Spraying is especially preferred when applying the coating to large areas using alternating exposure of oppositely-charged polyelectrolyte solutions (see Schlenoff et al. *Langmuir,* 16, 9968 (2000)). Spraying oppositely-charged polyelectrolyte solutions has several advantages over the Michaels coating and evaporation method, including: improved control over film thickness especially the ability to make extremely thin films (e.g., less than about 1 µm), and enhanced uniformity of film thickness especially over uneven surfaces and contours. The solutions may be sprayed onto a substrate by any applicable means (e.g., an atomizer, an aspirator, ultrasonic vapor generator, entrainment in compressed gas, or inkjet sprayer). In fact, a hand operated "plant mister" has been used to spray the polyelectrolyte solutions. Typically, the droplet size in the spray is about 10 nm to about 1 mm in diameter. Preferably, the droplet size is about 10 µm to 100 µm in diameter. The coverage of the spray is typically about 0.001 to 1 mL/cm$^2$, and preferably about 0.01 to 0.1 mL/cm$^2$.

It is known to those skilled in the art that fluorinated groups, especially chains of fluorinated hydrocarbons, cause aggregation, especially in aqueous solution. A system comprising aggregates as small particles dispersed in a solvent is known as a dispersion, or a suspension. A suspension of particles that are small enough such that they do not settle out is known as a colloid. Colloids in aqueous solution are often stabilized against aggregation into larger particles by having a surface charge. The surface charge can be derived directly from the material forming the colloid, or it can be maintained by the adsorption of a surface active agent, or surfactant. Charged surfactants stabilize suspensions by causing the surface of the particles to have the same charge and therefore repel each other. Neutral surfactants rely on steric interactions (repulsions) to prevent aggregation of suspended particles. In one embodiment of this invention, at least one of the fluorinated polymers is dispersed as a quasi-stable suspension in a solvent, and said suspensions are employed in the multilayering process. Preferably, the solvent comprising such suspensions comprises water. The particle size of the suspension is preferably less than about one micrometer, and more preferably less than about 100 nanometers. Preferably the particles comprising said suspension or dispersion bear a net surface charge.

Preferred suspensions for multilayering comprise polytetrafluoroethylene, or other aliphatic fluorinated polyalkenes, such as Teflon AF, Teflon AS, or ETFE, made by the Dupont company, where the inner core of the particle is not charged, but the outer surface is charged and stabilized. More preferred suspensions comprise fluorinated polymers comprising charged repeat units. Other preferred suspensions comprise telomerized fluoropolymers, including those produced by Asahi Glass, Atochem, Daikin, such as Daikin 3310 or 3311, Dupont, such as Dupont Tufcoat (Anionic), and Clariant, such as the NUVA fluoropolymers, such as NUVA CPA, NUVA 5006, and Peach State Labs, such as Myafax WS.

It is also known to those skilled in the art that fluoropolymers may be dissolved or dispersed in supercritical carbon dioxide, $CO_2$. The dielectric constant of supercritical $CO_2$ is low and matches that of fluorinated hydrocarbons including fluorinated monomers, which may be polymerized to yield fluorinated polymers in supercritical $CO_2$ (see DeYong et al. Chapter 13, in *Fluoropolymers* 1, *Synthesis,* Hougham et al Eds., Kluwer, New York, 1999). It is further known that fluoropolymers are swelled or dissolved in supercritical $CO_2$. Accordingly, in one embodiment of this invention, the fluorinated polyelectrolytes are applied by spraying them from solutions or suspensions in supercritical $CO_2$. Such application may proceed with simultaneous or sequential spraying of positive and negative fluorinated polyelectrolytes using different reservoirs for each polymer. The preferred concentration of fluorinated polyelectrolyte is 0.1 to 10 weight %. Optionally, a small volume fraction of organic solvent such as ethanol or methanol may be added to the supercritical $CO_2$ to improve the dispersion of said fluorinated polyelectrolytes.

In a further embodiment of this invention, a suspension of a polyelectrolyte complex comprising at least one negative fluorinated polyelectrolyte and at least one positive fluorinated polyelectrolyte are sprayed onto a surface from a solvent, preferably supercritical $CO_2$.

The duration in which the polyelectrolyte solution is typically in contact with the surface it is sprayed upon (i.e., the contact time) varies from a couple of seconds to several minutes to achieve a maximum, or steady-state, thickness. The contact duration is selected based on the desired relationship between throughput (i.e., the rate at which alternating layers are created) and layer thickness. Specifically, decreasing the contact duration increases throughput and decreases layer thickness whereas increasing the duration decreases throughput and increases thickness. Preferably, the contact time is selected to maximize the throughput of layers that have a satisfactory thickness and are uniform across the surface.

Other preferred methods of depositing the polyelectrolyte solutions and/or polyelectrolyte complex include casting, dip coating, and doctor blading. Particularly preferred methods are dip coating and spraying.

Optionally, rinsing may be employed to remove nonadsorbed polyelectrolyte, between the application of each polyelectrolyte solution. The rinsing liquid comprises an appropriate solvent (e.g., water or organic solvent such as alcohol). For water-soluble polyelectrolytes the preferred solvent is water. If the solvent is water, the rinsing liquid may also comprise an organic modifier (e.g., ethanol, methanol, or propanol). The concentration of organic modifier can be as high as less than 100 percent by weight of the rinsing liquid, but is preferably less than about 50 percent by weight. The rinsing liquid may also comprise a salt (e.g., sodium chloride) which is soluble in the solvent and the organic modifier, if included in the rinsing liquid. The concentration of salt is preferably below about 10 percent by weight of the rinsing liquid. It should be noted that as the concentration of organic modifier increases the maximum solubility concentration of salt decreases. The rinsing liquid, however, should not comprise a polyelectrolyte. The rinsing step may be accomplished by any appropriate means (e.g., flushing, dipping, or spraying). For spray rinsing, the amount of waste is preferably reduced by recycling the polymer solutions removed from the surface. Optionally, prior to depositing the second through $n^{th}$ layer of sprayed oppositely charged polyelectrolyte solution, the surface of the multilayer structure may be dried.

When performing multilayering by dipping, in order to avoid precipitation through cross-contamination, at least one of the rinse steps preferably employs a solvent which mixes with the solvents in which the polyelectrolytes are dissolved/dispersed.

Particles with diameters ranging from nanometers to millimeters may also be coated with polyelectrolyte complex. If the alternate layering method is used, it is not practical to coat particles individually. Neither is the spray method practical, unless particles are larger than about 100 μm. Instead, batches of particles are alternately immersed in coating solutions, with intervening rinse, as detailed by Caruso and Sukhorukov, Chapter 12 in "*Multilayer Thin Films*", G. Decher and J. B. Schlenoff, Eds., Wiley-VCH, Weinheim, 2003.

It is known by those skilled in the art that charged particles may be employed for creating multilayers. In fact, the first report on multilayering employed particles (see R. K. Iler, *J. Colloid Interface Sci.*, 21, 569 (1966) "Multilayers of colloidal particles"). In one embodiment of this invention, a preferred particle is an aqueous dispersion or suspension of fluorinated polymer (FP). The dispersion of the FP is preferably stabilized by a surface charge. A preferred FP dispersion comprises tetrafluoroethylene. Preferred composition for deposition suspensions comprises 0.01 to 1 weight % of FP particle. Preferred particle sizes for FP dispersions are less than 2 micrometers. Preferably, when using FP dispersions to create multilayers, at least one polyelectrolyte of opposite charge to that on the FP surface is also used. To maximize the amount of fluorine functionality, preferred multilayering polyelectrolytes are fluorinated polyelectrolytes. Preferred fluorinated polyelectrolytes are Nafion, when the FP dispersion is positively charged, and PFPVP when the FP dispersion is negatively charged.

In yet another embodiment of the present invention the polyelectrolyte complex is a coating or layer on a substrate or substratum and may be deposited according to any appropriate method (see, e.g., supra, as a multilayer or as a pre-formed polyelectrolyte complex). The substratum may be non-porous or porous and may be comprised of many types of materials that are well known in the art such as polymers, metals, and ceramics. The surface of polymeric support materials may be positively charged by comprising tetraalkyl ammonium groups, negatively charged by comprising sulfonate groups, or neutral. In another embodiment the substratum is porous and comprises a material selected from the group consisting of polypropylene, nylon, polytetrafluoroethylene, glass, and alumina (all of which are known to those of skill in the art). Typically, the average size of the pores is between about 10 nm and about 10 μm and the degree of porosity is between about 0.1 and about 60%. "Degree of porosity" refers to the volume % of the material that is occupied by pores. Advantageously, when the polyelectrolytes of the present invention are applied to a porous substrate, the polyelectrolytes achieve a high degree of penetration into the substrate's pores. For example, a first polyelectrolyte solution comprising a charged fluorinated polyelectrolyte may be applied to a porous substrate and the solution allowed to penetrate the pores. A second polyelectrolyte solution comprising a charged fluorinated polyelectrolyte having a charge opposite to that of the first polyelectrolyte solution may then be applied to the porous substrate. The oppositely charged fluorinated polyelectrolytes may then form an interpenetrating network of complexed fluorinated polyelectrolytes which is insoluble, which is resilient, and which will not migrate once applied to the porous substrate. Advantageously, such an interpenetrating network of complexed fluorinated polyelectrolytes is highly water resistant and can protect the material from corrosion and wear.

In another embodiment the polyelectrolyte complex is a free, or isolated, membrane. Typically, an isolated membrane comprising a polyelectrolyte complex is formed by depositing the complex on a support and then dissolving the support. For example, a cellulose acetate support may be dissolved with acetone to remove it from a multilayer comprising charged particles and polymers. See Mamedov et al., *Langmuir* 16, 5530 (2000). This process typically has characteristics that are often considered to be drawbacks. For example, it may be slow, typically requires disposal of organic solvents, it destroys the substratum, may be difficult or impossible to employ on a multilayer membrane which does not contain charged particles, and may denature, or deactivate, biologically-derived species (e.g., enzymes) incorporated within the membrane.

Alternatively, isolated membranes may be produced by using a release stratum that has a composition that is different from the remainder of the membrane, the release stratum is designed to decompose, dissociate, or become weakly associated under certain conditions (e.g., a change in salt concentration, pH, and/or temperature) thereby freeing the membrane from a substratum. This approach was set forth in U.S. Prov. App. Ser. No. 60/284,723 and PCT App. No. PCT/US02/11917 and U.S. application Ser. No. 10/475,236 which are hereby incorporated by reference in their entirety for all purposes. These disclose a releasable membrane structure for producing a free membrane comprising a substratum or support and a release stratum deposited on the substratum. In the present invention, a membrane stratum comprising the HFTFPC is deposited on the release stratum. Each release stratum comprises at least two oppositely-charged polyelectrolytes and is preferably a sequence of alternating oppositely-charged polyelectrolytes applied as layers. Due to the extensive interpenetration of neighboring oppositely-charged polyelectrolyte amongst the layers, each stratum is preferably at least several layers thick (e.g., at least about 4 oppositely-charged polyelectrolyte layers and more preferably at least about 8 oppositely-charged polyelectrolyte layers). Selective decomposition of the oppositely-charged polyelectrolytes of the release stratum affords controlled separation of high quality free membranes. Examples of release stratum polyelectrolytes and dissociation stimuli include PSS/PDADMA and a NaCl solution about 3.5 M; PAA/PDADMA and NaCl solution about 0.6 M; and PSS/PDADMA-co-PAA and a solution having a pH of 6. Thus, depending on the desired polyelectrolyte free membrane, the appropriate oppositely-charged polyelectrolytes may be selected to create a release stratum that decomposes, dissociates, or becomes weakly associated under conditions which do not negatively impact the integrity of the free HFTFPC membrane. A preferred release stratum is a multilayer of PDADMA-ran-PAA random copolymer with a PAA content of between 20 and 60 mole % (based on the polymer repeat unit) layered with PSS under conditions of solution and rinse pH of less than 4. The preferred release stimulus for this stratum is exposure to solution pH above about 5.

In one embodiment of this invention, a free membrane is created with a HFTFPC stratum on one side and a hydrophilic stratum on the other side. Preferably the hydrophilic stratum comprises polyacrylic acid, more preferably, the hydrophilic stratum comprises a copolymer of acrylic acid and a zwitterion, where the zwitterion preferably comprises between 10 and 90 mole % of said copolymers. Preferably the zwitterion repeat unit is 3-[2-(acrylamido)-ethyldimethyl ammonio] propane sulfonate, AEDAPS. Preferably both sides of the membrane bear the same charge, so that there will not be a tendency for the membranes to self-associate.

In cases where the delamination of HFTFPC from the substrate is not desired, an intermediate nonfluorinated polyelectrolyte layer, or a stratum of nonfluorinated polyelectrolyte complex, is placed between the HFTFPC and the substrate. Preferred polyelectrolytes for this purpose include polyethyleneimine and poly(N-alkylvinylpyridiniums), where the N-alkyl group comprises 4 to 18 carbons. Said poly(N-alkylvinylpyridiniums) are organic-soluble and, having a hydrophobic character intermediate between a water-soluble polyelectrolyte and a fluorinated polyelectrolyte, enhance the adhesion of the HFTFPC to a substrate.

Other preferred methods of enhancing the adhesion between a HFTFPC and a substrate include chemically bonding adhesion-assisting molecules to the substrate. For silica or glass substrates, preferable bonding adhesion-assisting molecules are siloxanes and chlorosilanes. The chemical modification of surfaces with siloxanes and chlorosilanes is well known to those skilled in the art. Preferably, siloxanes with charged, or chargeable, groups are employed, such as aminoalkyltrialkoxysilanes.

The following shorthand for multilayers is used: $(A/B)_x$ where A is the starting cationic polyelectrolyte contacting the substrate, B is the anionic polyelectrolyte, x is the number of layer pairs. All the starting substrates for deposition were negative. In $(A/B)_x A$, A would be the terminating polymer. Salt, MY (cation $M^+$ and anion $Y^-$), has an important role in the buildup process and is represented by $(A/B)_x$ @c MY, where c is the molarity of the salt (MY) in the polymer solution. The pH can be included in the nomenclature especially when using pH dependent PEMUs. For example, $(PAH/PAA)_4$ @0.25 M NaCl @pH 7.4, represent four layer pairs of PAH/PAA built at 0.25 M NaCl and a pH of 7.4.

The following examples further illustrate the present invention. The above described polyelectrolytes, additives, and deposition methods were used for building HFTCPCs of a variety of compositions on substrates. The HFTCPCs, solutions, and additives were modified in various ways as shown in the examples, and the effects of those modifications were monitored.

EXAMPLE 1

Synthesis of Fluorinated Cationic Polyelectrolyte PFPVP 1,1,1,2,2,3,3,4,4,5,5,6,6-tridecafluoro-8-iodooctane, (TDFI, $C_8H_4F_{13}I$) was reacted with poly(4-vinyl pyridine) to give a highly fluorinated polyelectrolyte with novel properties. 1.0 equivalent (1.05 g, 10 mmol) of poly(4-vinylpyridine), P4VP (molecular weight ~300,000) from Polysciences Inc., was dried at 110° C. for 4 hours. It was then dissolved in a 50 mL 1:1 v/v mixture of dry DMF and nitromethane. At 50° C., under stirring and argon atmosphere, 1.2 equivalents (5.7 g, 12 mmol) of TDFI was injected into the reaction mixture. The reaction proceeded for another 48 hours at 80° C. under stirring and inert atmosphere. The product was precipitated out of solution using ethyl acetate, washed with petroleum ether, filtered, and dried under vacuum for 24 hours at 60° C. The product was characterized by FTIR spectroscopy and extensive alkylation by the fluorinated hydrocarbon was identified by the distinctive C—F stretch in the 1200 $cm^{-1}$ region of the spectrum. There were also stretches in 2900-3050 $cm^{-1}$ region due to presence of aromatic and aliphatic (methylene and methane) hydrogens. C=C and C=N stretches were also evident in the 1550-1650 $cm^{-1}$ region. The spectrum of the fluorinated polyelectrolytes was compared to a known sample of perfluorooctyl iodide and the two showed indistinguishable features in the 1200 $cm^{-1}$ region where the C—F stretches appear. Calculated (found) elemental analysis (Atlantic Microlab Inc.): 40.90 (40.95) wt % C, 3.39 (3.34) % H, 5.06 (5.11) % N, 29.46 (29.54) % F and 17.58 (17.48) % I. The elemental analysis results showed the polymer to be 45±3% quaternized with the fluorinating reagent. Experimental reaction yield was 90%.

For simplicity, the abbreviation PFPVP is used throughout this work instead of Poly(4-vinyl-trideca fluoro octyl pyridinium iodide)-co-poly(4-vinyl pyridine), P4VTDFOP-co-P4VP. Refer to Table I for the structure of PFPVP.

EXAMPLE 2

Layer-by-layer Buildup of (PFPVP/Nafion) Multilayers

PEI $(Nafion/PFPVP)_{10}$ polyelectrolyte multilayers were built on double-side-polished Si [100] wafers using polyethyleneimine (PEI) as the first layer. The polyelectrolytes were 1 mM based on repeat units. Exposure time for polyelectrolytes was 5 minutes with 3 intermediate rinses in methanol for 30 seconds.

Thickness was measured for every layer using a Gaertner Autogain L116S ellipsometer. The ellipsometer determined both the refractive index and the thickness for multilayers in the 100 nm range, and the refractive index was used for thickness v. layer number measurements. A plot of thickness (Å) versus number of layers is shown in FIG. 1. Each layer provides an increment in thickness, showing that thin films of complexed fluorinated polyelectrolytes may be systematically built up.

EXAMPLE 3

Thicknesses and Refractive Indices for Different Polyelectrolyte Combinations $(PDADMA/PSS)_{10}$ @0.25M NaCl, $(PDADMA/Nafion)_{10}$, $(PFPVP/PSS)_{10}$, and $(PFPVP/Nafion)_{10}$ were built and their thickness and refractive indices were measured using ellipsometry. PEI was not used as initial adhesion layer. The results are reported in Table V. It is seen that PEMUs comprising fluorinated polyelectrolyte have lower refractive indices than PEMUs without fluorinated polyelectrolyte.

TABLE V

Thickness and refractive indices measurements of different PEMU combinations used in this study.

| PEMU System | Refractive Index | Thickness (Å) |
|---|---|---|
| $(PDADMA/Nafion)_{10}$ | 1.35 | 310 |
| $(PFPVP/PSS)_{10}$ | 1.49 | 441 |
| $(PDADMA/PSS)_{10}$ | 1.56 | 567 |
| $(PFPVP/Nafion)_{10}$ | 1.40 | 882 |

EXAMPLE 4

Water Content Inside Polyelectrolyte Systems $(PDADMA/PSS)_{10}$ @0.25M NaCl, $(PDADMA/Nafion)_{10}$, $(PFPVP/PSS)_{10}$, and $(PFPVP/Nafion)_{10}$ were built using polyelectrolyte solutions of 1 mM concentration (based on the repeat unit) and their water content was estimated using Fourier Transform Infrared Spectroscopy (FTIR) with 32 coadded scans (for sample and background) at a resolution of 4 $cm^{-1}$. Spectra were collected while the multilayers were at 20% relative humidity at 24.9° C. The background was first collected using a clean silicon wafer then the IR of the sample was collected. Water vapor spectrum was subtracted from the final spectrum.

Figure 2:
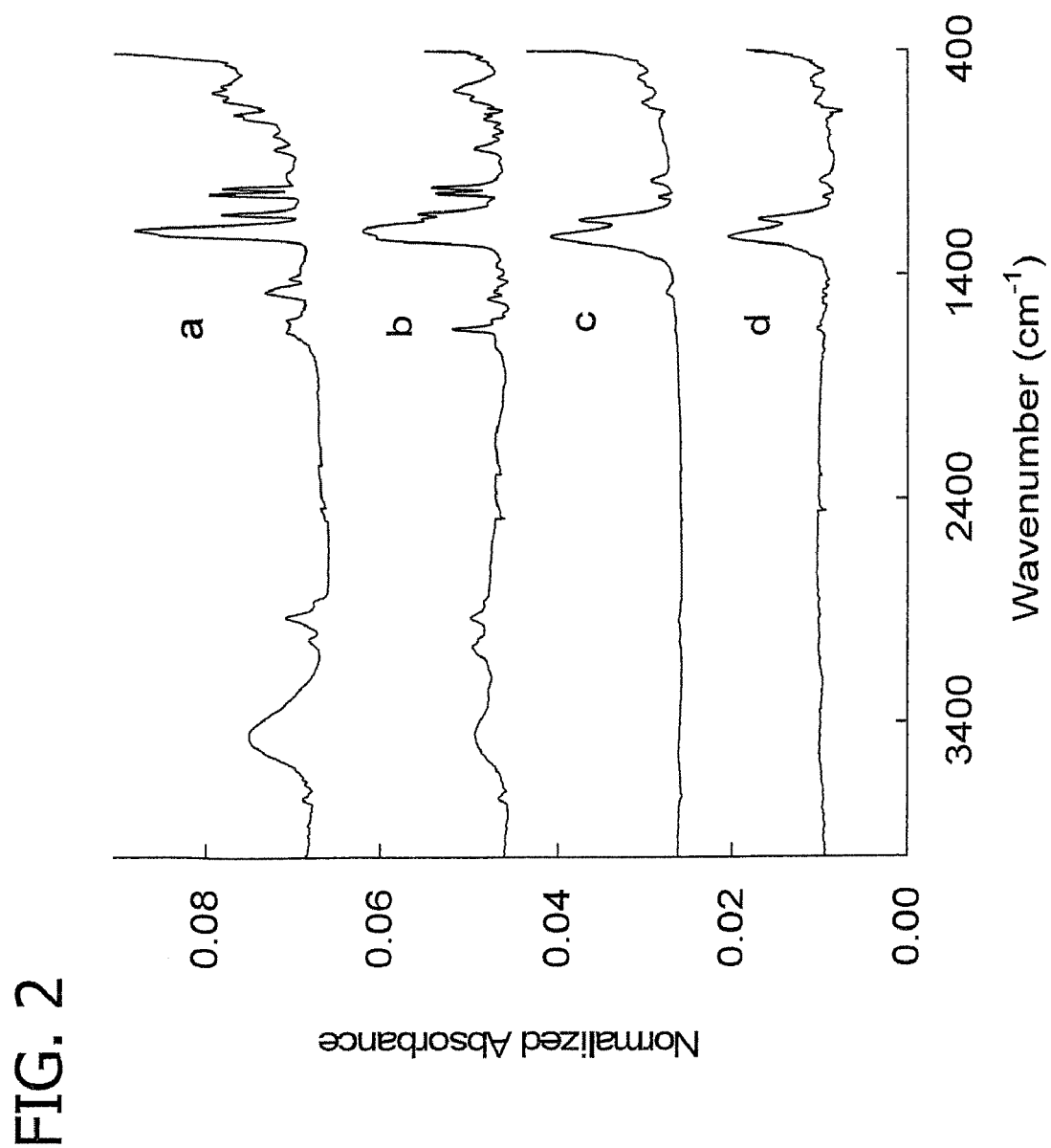
FIG. 2 shows normalized Fourier Transform Infrared (FTIR) spectra of (a) (PDADMA/PSS)$_{10}$, (b) (PDADMA/Nafion)$_{10}$, (c) (PFPVP/PSS)$_{10}$, and (d) (PFPVP/Nafion)$_{10}$ obtained according to the method of Example 4. PEI was not used in this case. Carbon dioxide peaks were zeroed out for clarity.

It is observed from the IR spectra (FIG. 2) that (PDADMA/PSS)$_{10}$ (spectrum labeled a in FIG. 2) contains the highest percentage of water (band seen between 3200 and 3500 cm$^{-1}$) compared to the other three multilayer systems. Nafion-PFPVP (spectrum labeled d in FIG. 2) contains virtually no water. The area of the water peak in the various PEMUs was normalized against the sulfonate content (an internal standard) and compared as a bar graph in FIG. 3.

Figure 3:
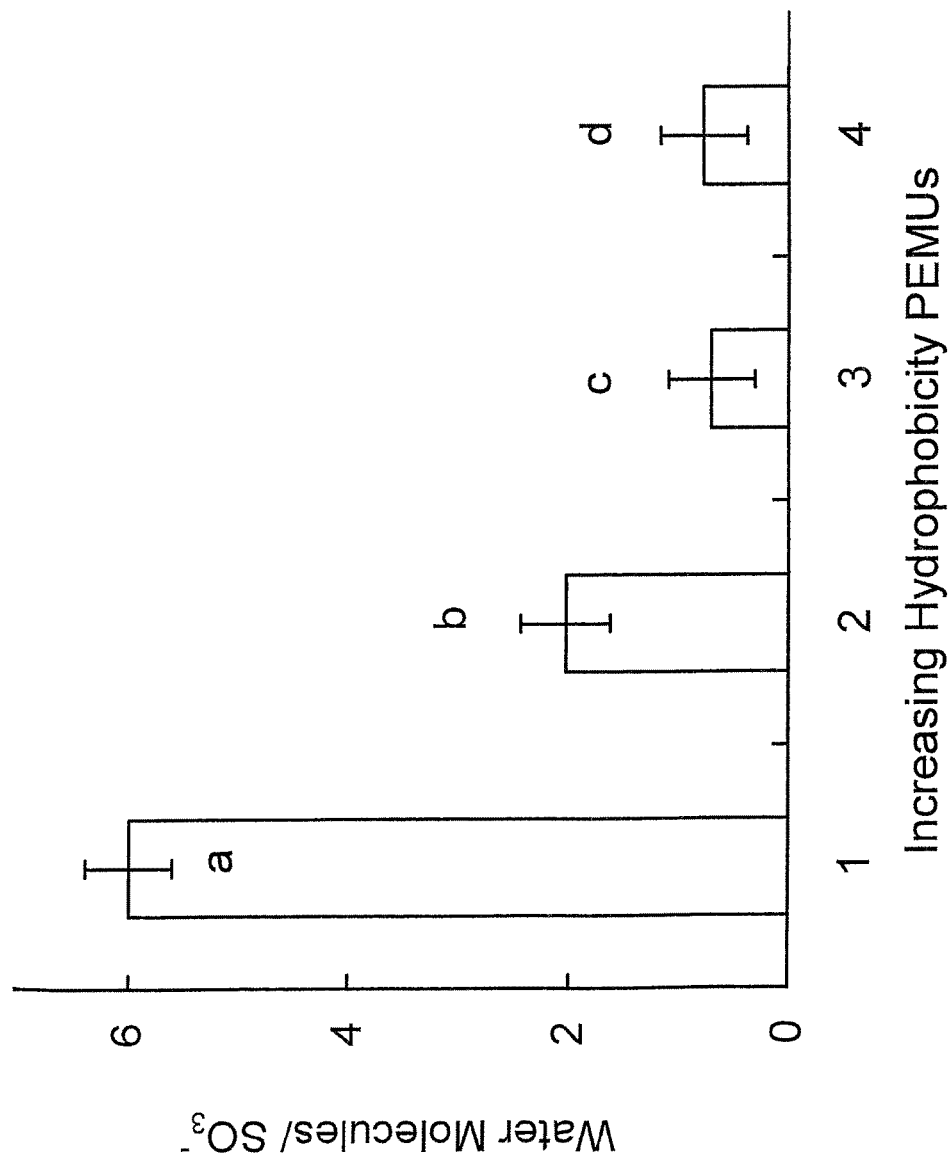
FIG. 3 shows normalized water peak areas as a function of increasing hydrophobicities of: (a) (PDADMA/PSS)$_{10}$, (b) (PFPVP/PSS)$_{10}$, (c) (PDADMA/Nafion)$_{10}$, and (d) (PFPVP/Nafion)$_{10}$ obtained according to the method of Example 4. The sulfonate peak area was used as an internal standard.

Since all multilayers contained the sulfonate group, it was possible to determine the amount of water relative to this functional group. The data in FIG. 3 are presented in terms of the number of water molecules per sulfonate group. From FIG. 3, it is observed that (PDADMA/PSS)$_{10}$@0.25 M NaCl (sample a) has the highest water content and is thus the most hydrophilic compared to (PFPVP/Nafion)$_{10}$ (sample d).

Figure 4:
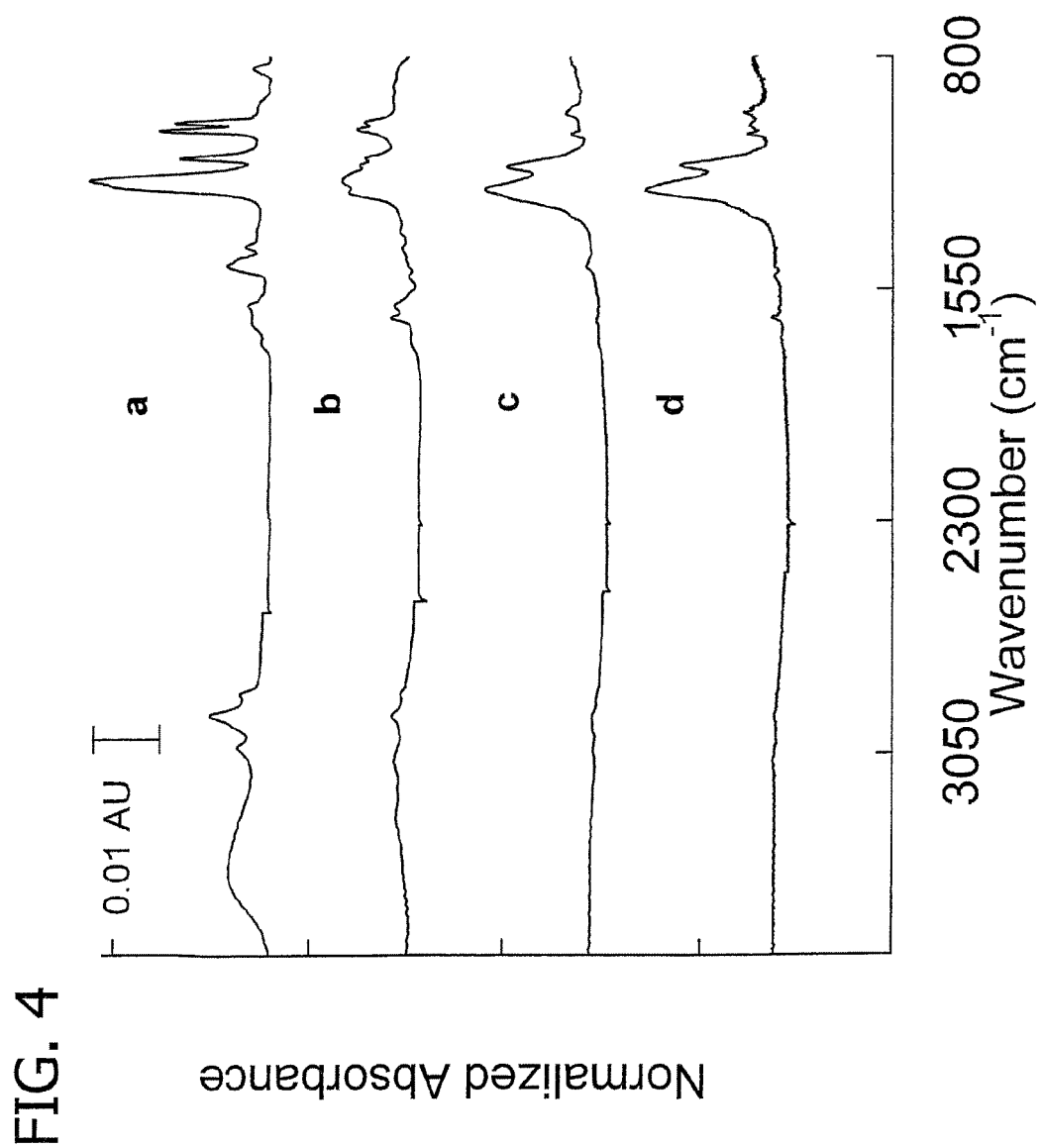
FIG. 4 shows normalized FTIR spectra of 21 layers of (a) (PDADMA/PSS)$_{10}$PDADMA @0.25M NaCl, (b) (PFPVP/PSS)$_{10}$PFPVP (1 mM), (c) (PDADMA/Nafion)$_{10}$PDADMA (1 mM), and (d) (PFPVP/Nafion)$_{10}$PFPVP (1 mM) obtained according to the method of Example 4. PEI was not used in any of these systems. Carbon dioxide peaks were zeroed out.
Figure 5:
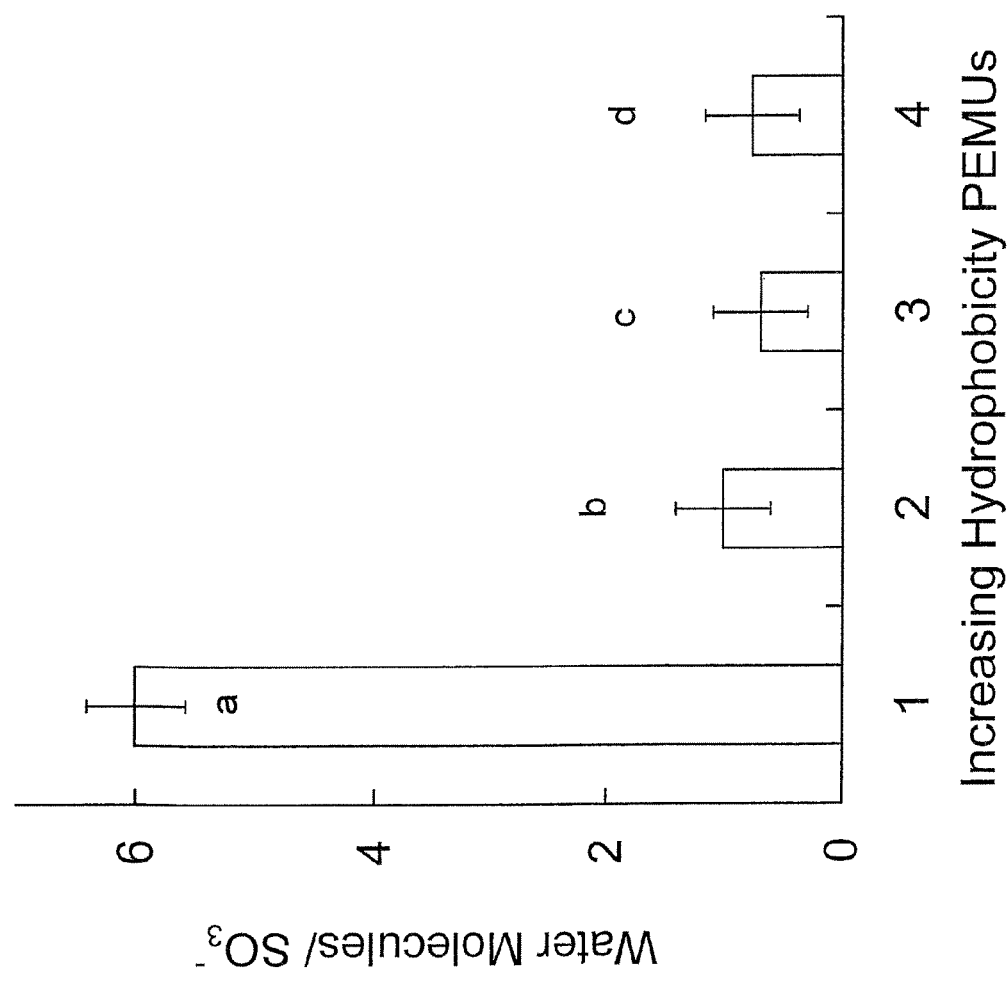
FIG. 5 shows normalized water peak areas as a function of increasing hydrophobicities of: (a) (PDADMA/PSS)$_{10}$PDADMA @0.25M NaCl, (b) (PFPVP/PSS)$_{10}$PFPVP (1 mM), (c) (PDADMA/Nafion)$_{10}$PDADMA (1 mM), and (d) (PFPVP/Nafion)$_{10}$PFPVP (1 mM) obtained according to the method of Example 4. PEI was not used in any of these systems. The sulfonate peak area was used as an internal standard. No PEI was used in the buildup here.

In order to detect the effect of PFPVP and Nafion on water, a layer of PFPVP was added to a (PFPVP/PSS)$_{10}$ system, and a layer of PDADMA was added to (PDADMA/Nafion)$_{10}$ system and IR spectra were taken following the same procedure and under same conditions of relative humidity and temperature (FIG. 4). Due to the addition of PFPVP, the water content was found to decrease whereas the addition of PDADMA had no significant effect on water. FIG. 5 may be compared with FIG. 3 to show that adding an extra layer of PFPVP (sample b) decreases the water content compared to a PEMU that is terminated by PSS. This demonstrates the importance of the "top" or terminating layer on the water content of the polyelectrolyte complex thin film.

EXAMPLE 5

Wetting by Water: Contact Angle Measurements

The dynamic contact angle analyzer is an instrument used to measure the surface properties of solid and liquid samples using the Wilhelmy technique. It consists of a highly sensitive balance, a moving stage mechanism, and a control station. This method measures the forces that are present when a sample of solid is brought into contact with a test liquid. If the forces of interaction, geometry of the solid, and surface tension of the liquid are known, the contact angle may be calculated. The sample of the solid to be tested is hung on a sensitive balance. The liquid is then raised to contact the solid. When the solid contacts the liquid, the change in forces is detected and the balance will record this elevation as zero depth of immersion. As the solid is lowered into the liquid the forces on the balance are recorded. These forces are:

$F_{total}$=wetting force+weight of probe−buoyancy    1.8

The buoyancy and the weight of the probe are both removed by the instrument software and what is remained is only the wetting force. The liquid used here is water with a surface tension known to be 72.3 mNm$^{-1}$. As the solid advances into the liquid, the advancing contact angle is measured and as the solid retreats from the liquid, the receding angle is measured. (PDADMA/PSS)$_{10}$PDADMA @0.25M NaCl, (PDADMA/Nafion)$_{10}$, (PFPVP/PSS)$_{10}$PFPVP, and (PFPVP/Nafion)$_{10}$PFPVP were coated on double side polished silicon wafers of rectangular shape and their dynamic contact angle was measured. A clean silicon wafer was taken as a blank. The results are shown in Table VI.

Advancing static contact angle measurements were conducted on all the films to determine their "surface" hydrophobicity and wetting behavior as is shown in Table V. The contact angles in this work are advancing contact angles measured with the standard sessile drop technique using an NRL contact angle goniometer model 100-00 (Rame-Hart Inc.). Initially, the surface of the substrate and the baseline of the instrument are adjusted to achieve coincidence. A water drop is made on the tip of the syringe. Then, the sample was raised up until there was contact between the drop and the surface. The sample platform and the microscope were refocused to view the far left or the far right of the water drop on the substrate. The measuring crosshair was adjusted afterwards as a tangent to the drop profile at its base. The angle of intersection of the vertical and horizontal crosshairs is read to give the contact angle. Subsequent addition of a small amount of water to the drop on the surface and readjustment of the microscope and crosshairs gave a static advancing contact angle. The right and left contact angles of the water drop with the sample were taken. Measurements were done at 5 different locations of the sample and averaged out to minimize errors that might arise due to surface contamination, roughness, or surface reconstruction. The volume of the drop was maintained at 10 μL.

TABLE VI

Different PEMU combinations along with their corresponding dynamic and static contact angle measurements.

| PEMU System | Dynamic Contact Angle | Advancing Contact Angle |
| --- | --- | --- |
| Blank | Advancing 20.87 Receding 17.63 | — |
| (PDADMA/PSS)$_{10}$PDADMA | Advancing 61.10 Receding 30.84 | 15 |
| (PFPVP/PSS)$_{10}$PFPVP | Advancing 97.81 Receding 19.10 | 75 |
| (PDADMA/Nafion)$_{10}$ | Advancing 95.75 Receding 23.79 | 112 |
| (PFPVP/Nafion)$_{10}$PFPVP | Advancing 114.16 Receding 27.72 | 118 |

EXAMPLE 6

Enhanced Hydrophobicity Using Clay Particle/Fluorinated Polyelectrolyte Combinations 0.10 grams of attapulgite clay (Engelhard, Attagel 50) was dispersed in 100 mL H$_2$O under efficient stirring for 24 hours and was combined with different polymers to build different zones on a silicon wafer. The aim for this was to create a more hydrophobic surface by increasing its roughness.

Figure 6:
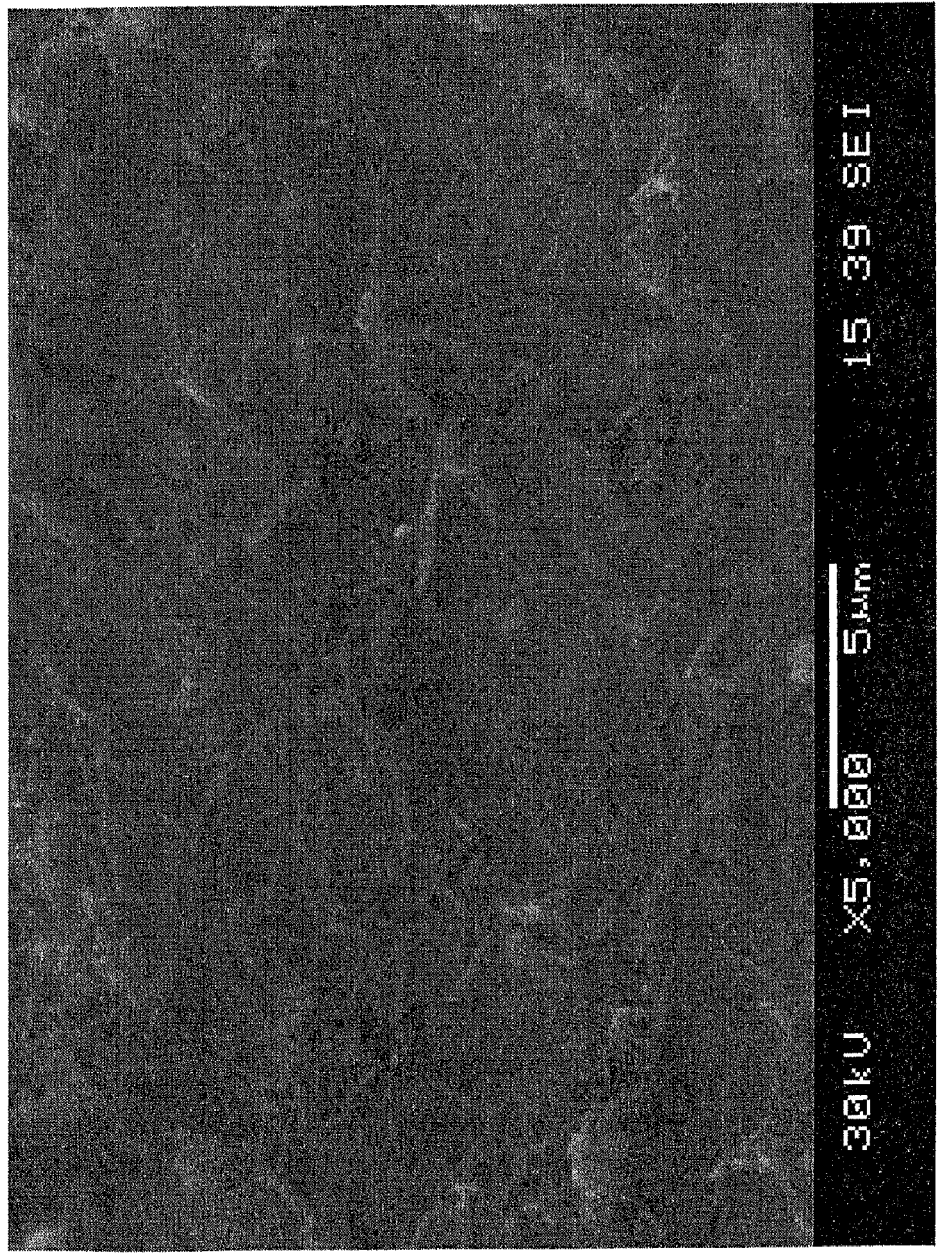
FIG. 6 shows a Scanning Electron Microscope (SEM) image of a polyelectrolyte-attapulgite clay multilayer combination obtained according to the method of Example 6. All experimental conditions are shown in FIG. 6. The SEM stage was tilted 50° to obtain a 3D image.

The different zones were:
 Zone 1 (contacting the substrate): (PDADMA/PSS)$_3$ @1M NaCl with water rinsing
 Zone 2 (intermediate roughening layer): (PDADMA/Clay)$_3$ PDADMA with water rinsing
 Zone 3 (fluorinated polyelectrolyte layer): (Nafion/PFPVP)$_2$ with methanol rinsing The advancing contact angle was measured for the 14 layers and was found to be 168° with an error of 5° using the same static advancing contact angle technique detailed in Example 5. Scanning electron microscope (SEM) micrographs of the multilayer were taken using a SEM. The SEM stage was tilted at 50°. Other experimental settings are labeled on FIG. 6. Attapulgite, a clay with a needle-like morphology, was used to produce roughness on the surface of the substrate.

EXAMPLE 7

Antiwetting Properties of Nafion-PFPVP on Leather 100 mL solutions of 1 mM PFPVP and Nafion in methanol were prepared and introduced into a spray bottle. A piece of uncoated suede leather was sprayed alternately with the PFPVP and Nafion solutions, twice each, and allowed to dry. Bare leather was taken for comparison. A drop of water was introduced on the surface of both the coated and the uncoated leather. The drop of water was found to be absorbed as soon as it contacted the surface for the uncoated leather. By comparison, on the leather coated with HFTFPC, the drop of water stayed on the surface for 3 minutes before it was absorbed. Another experiment was done where the HFTFPC coated leather was immersed completely in water and for about 1 minute the leather remained dry, then it started absorbing water, whereas the uncoated leather immediately absorbed water. When water was poured onto the HFTFPC-coated leather it ran off, whereas the untreated leather adsorbed the water like a sponge. Thus, water was absorbed more easily by the uncoated leather than by the multilayer coated one.

EXAMPLE 8

Waterproofing of Building Materials

Three kinds of construction, or building, materials were coated with (PVPVP/Nafion)$_3$ to evaluate the effectiveness of this multilayer at preventing water wetting or water impregnation. See Table VII. The brick was a standard red exterior construction brick fired at high temperature. A red tile was an unglazed tile fired at high temperature (also known as a "quarry" tile), while a yellow tile was a low-temperature fired clay tile (also known as a "Mexican tile" which is known to be particularly absorbing). The tiles are commonly finished, or sealed, with various water-repelling agents to seal them against water penetration and therefore to enhance their appearance and lifetime. Bricks and tiles were coated with (PFPVP/Nafion)$_{10}$ by alternately spraying solutions of PFPVP and Nafion. Advancing contact angles were taken and compared to uncoated ceramics. For the coated yellow tile a drop of water was found to take 45 seconds before it was completely absorbed while in the uncoated one the drop of water was absorbed as soon as it contacted the surface. For the red tile, it was observed that water was not absorbed at all for the coated sample where as it took 10 minutes to be absorbed by the uncoated sample. For the brick, water was directly absorbed for the uncoated sample whereas it was not absorbed at all for the coated sample. Also, it was observed that using (PFPVP/Nafion)$_3$ is sufficient to give the same hydrophobic surface protecting properties.

TABLE VII

Advancing contact angles of different types of ceramics, uncoated and coated with (PFPVP/Nafion)$_3$.

| Ceramic Type | Advancing contact angle of uncoated surface ±4° | Advancing contact angle of coated surface ±4° |
|---|---|---|
| Yellow Tile | 0° | 126° |
| Red Tile | 32° | 50° |
| Brick | 0° | 67° |

EXAMPLE 9

Permeability Control Using Fluorinated Multilayers

The permeabilities of PFPVP multilayer combinations were tested using rotating disk electrode (RDE) voltammetry with both 1 mM ferricyanide Fe(CN)$_6^{3-}$ (as the potassium salt) and 1 mM iodide (as KI) as probe ions and with varying NaCl or "salt" concentration. The area of the bare electrode was 0.486 cm$^2$, and the area of the coated electrode was 0.459 cm$^2$. A reference electrode (Saturated Calomel Electrode, SCE) and platinum flag counter electrode were also used. Potentials were controlled with a Princeton Applied Research potentiostat interfaced to a computer. The bare and the coated working electrodes were first polished with alumina polish (0.05µ) for 1 minute, rinsed in water, sonicated for 1 minute, and then immersed in 1 mM mercaptoethane sulfonic acid for 15 minutes to produce a highly charged surface. (PFPVP/Nafion)$_7$ HFTFPCs were built on the RDE electrode. Rinsing was in methanol for 30 seconds, and exposure to polymer solution (1 mM) was 5 minutes. The last layer was left 3 hours in 10 mM NaCl/10 mM Nafion, then dried with nitrogen, and left to anneal for 24 hours. The temperature of the potentiostat was maintained at 22° C. and the speed of the RDE was set at 1000 rpm. The solutions used were 1 mM ferricyanide and 1 mM potassium iodide in 0.2, 0.6, 0.8, 1.0, 1.3, 1.6, and 2.0 M NaCl respectively. Scan rate was 0.01 V/s.

Voltage was scanned from 50 mV to 500 mV for ferricyanide while that for potassium iodide was scanned from 0 to 800 mV.

The ion permeation flux of (PFPVP/Nafion)$_7$ combination was compared with 3 other multilayer systems: (PDADMA/Nafion)$_7$, (PDADMA/PSS)$_7$ @0.25M NaCl, and (PFPVP/PSS)$_7$.

The multilayer systems showed a wide range of bulk hydrophobicity differences with the (PDADMA/PSS)$_7$ combination being the most hydrophilic. The same procedure was followed and 14 layers of each of the above polymers were built on the RDE electrode with the last negative layer kept for 3 hours in 10 mM of the negative polyelectrolyte/10 mM NaCl and annealed for 24 hours.

Low molecular weight alcohols such as methanol and ethanol in addition to water were used for rinsing in (PDADMA/Nafion)$_7$ and (PFPVP/PSS)$_7$ combinations. Water was used for rinsing (PDADMA/PSS)$_7$ multilayers.

Membrane current densities were taken for both the bare and the coated RDE electrode for the above solutions under an inert atmosphere of argon. Membrane current density (µA cm$^{-2}$) versus the salt activity was recorded. Salt activities and membrane current densities ($J_m$) were calculated using the following equations:

$$\text{Activity} = \text{activity coefficient} * \text{Salt concentration} \quad 1.1$$

$$J_1 = I_{bare}/\text{area of bare electrode} \quad 1.2$$

$$J_2 = I_{coated}/\text{area of coated electrode} \quad 1.3$$

$$J_m = (J_1 * J_2)/(J_1 - J_2) \quad 1.4$$

Experimentally, the flux and the permeability coefficients of different probe ions through different multilayer systems are defined and calculated according to the following equations:

$$J = \frac{\overline{DC}}{t} \quad 1.5$$

$$J = \frac{i}{nFA} \quad 1.6$$

$$P_c = \frac{J \cdot t}{C_{Feed}} \quad 1.7$$

Where J is the flux of the membrane in mol/cm²s, $\overline{D}$ is the membrane diffusion coefficient of the probe molecules in cm²/s, $\overline{C}$ is the probe molecule concentration inside the membrane in mol/cm³, i is the membrane current (C/s), n=1 is the number of electrons involved, F is Faraday's constant (96,500 C/mol), A is the area of membrane (0.486 cm² in our case), $P_c$ is the permeability coefficient (cm²/s), t is thickness of the membrane, $C_{Feed}$ is concentration of feed solution of iodide or ferricyanide ($1 \times 10^{-6}$ mol/cm³).

Figure 7A:
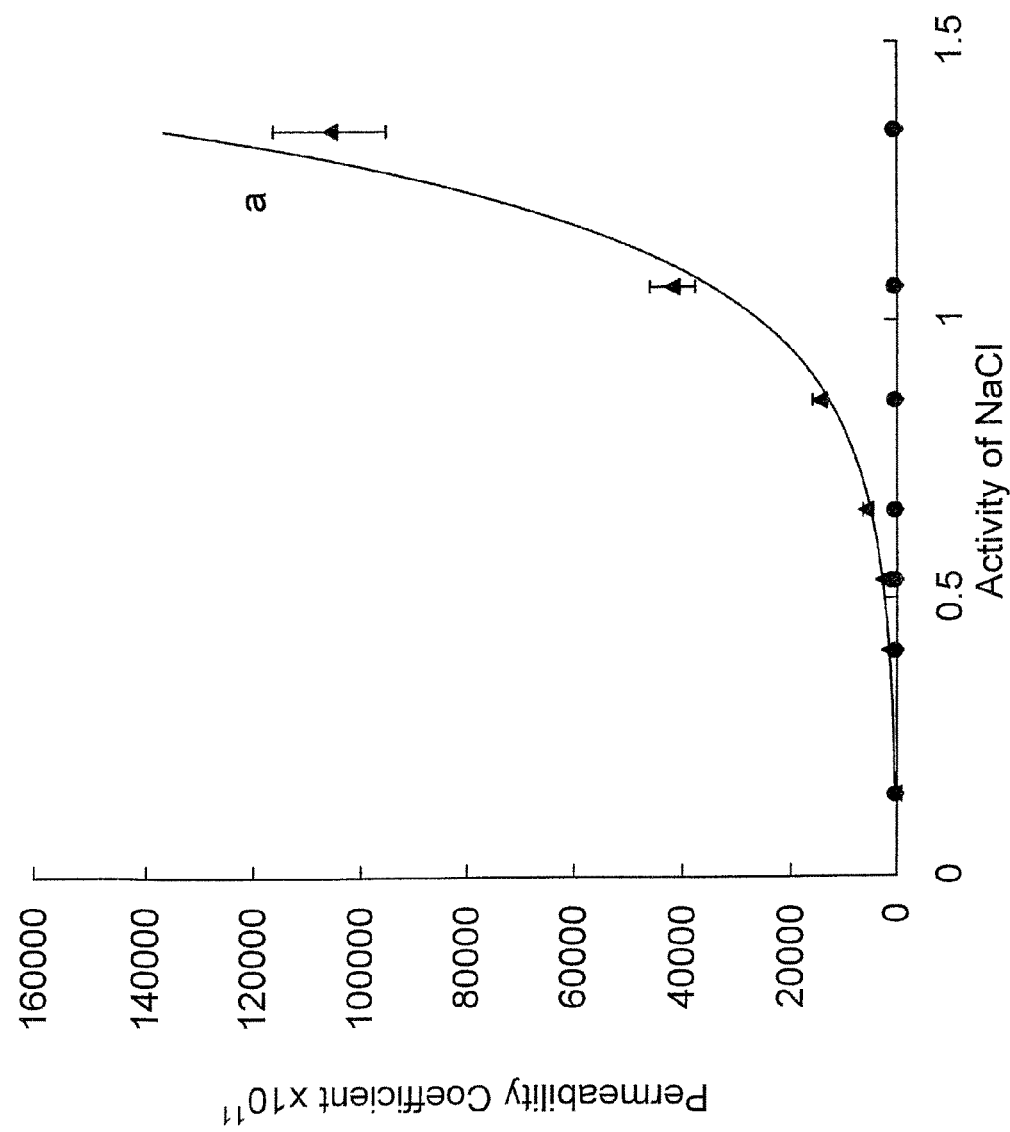

Note that the activity coefficients were obtained from their corresponding salt concentrations. The highest membrane currents were obtained when ferricyanide was tested using $(PDADMA/PSS)_7$ (a in FIG. 7A). This indicates that $(PDADMA/PSS)_7$ is much more hydrophilic and thus more permeable to ferricyanide than all the other multilayer combinations. On the other hand, a very low flux (almost negligible) was obtained when $(PFPVP/Nafion)_7$ (d in FIG. 7B) combination was used indicating that the latter acts as a barrier to ferricyanide permeation implying hydrophobic behavior.

Figure 8A:
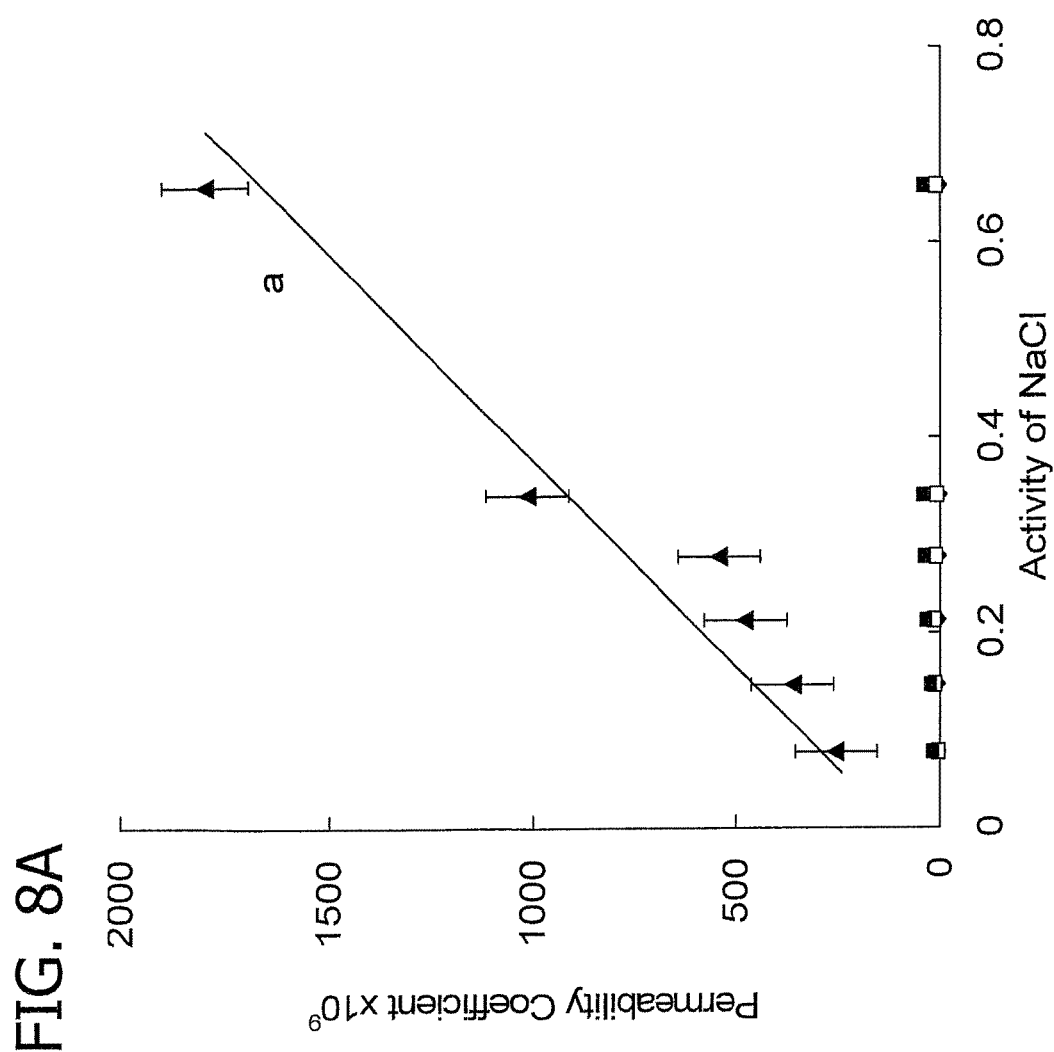
FIGS. 8A and 8B show permeability coefficients of 1 mM potassium iodide through (a) (PDADMA/PSS)$_7$ @ 0.25 M NaCl, (b) (PDADMA/Nafion)$_7$, (c) (PFPVP/PSS)$_7$, and (d) (PFPVP/Nafion)$_7$ obtained according to the method of Example 9. All the polymer deposition solutions were 1 mM based on repeat unit and were deposited from no salt except for the (PDADMA/PSS)$_7$ combination which was deposited using 0.25M NaCl. A magnified diagram of 8A (depicted as FIG. 8B) showing the permeability of 1 mM potassium iodide through 3 multilayer systems: (b) (PDADMA/Nafion)$_7$, (c) (PFPVP/PSS)$_7$, and (d) (PFPVP/Nafion)$_7$. All the polymer deposition solutions were 1 mM based on the repeat unit and were deposited from no salt. Two rotating disk electrodes, bare and coated, were used, and their areas were 0.486 cm$^2$ and 0.459 cm$^2$ respectively. Rotation rate was 1000 rpm. SCE was used as a reference electrode. Voltage scan was in the range (−0.05 V to 0.5 V) versus SCE.
Figure 8B:
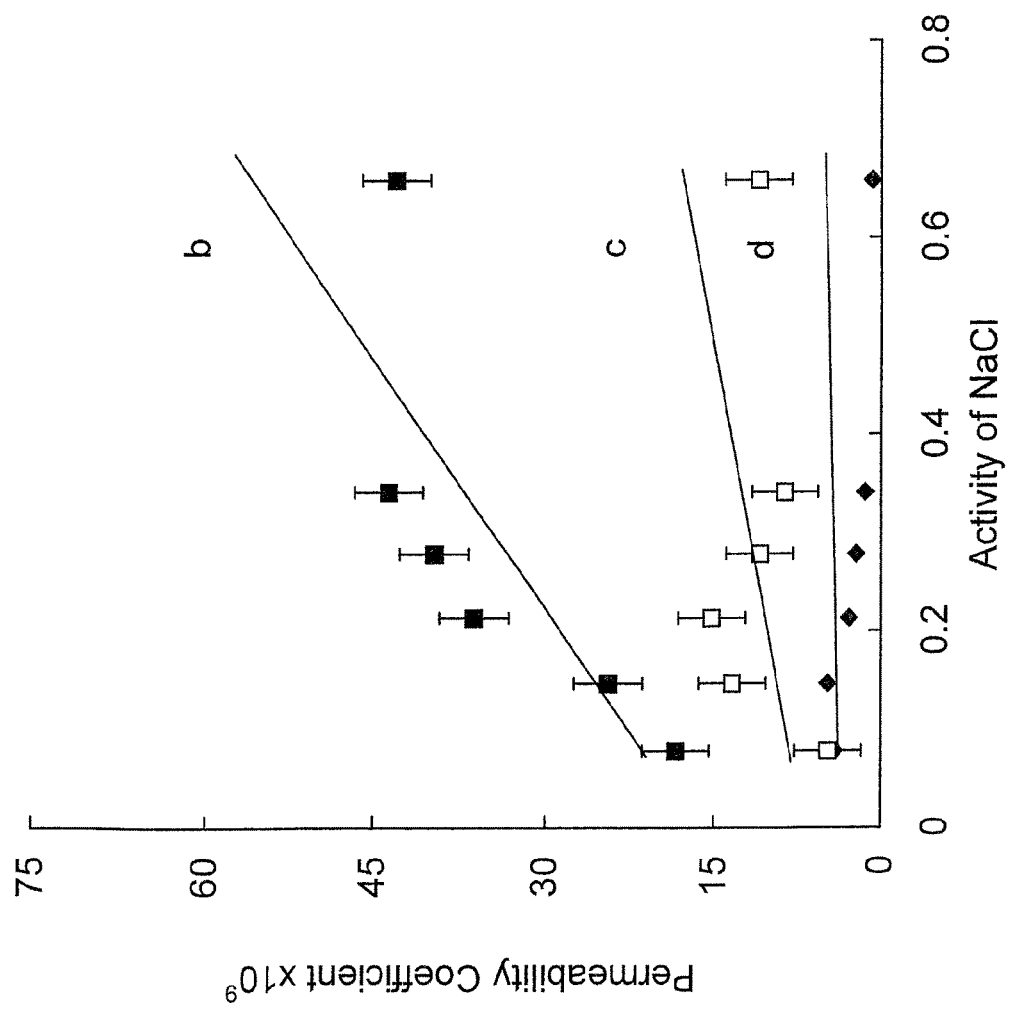

$(PFPVP/Nafion)_7$ was observed to behave in a similar manner when the permeability of iodide ion was tested as in shown in FIGS. 8A and 8B. This indicates that the $(PFPVP/Nafion)_7$ (d in FIG. 8B) combination can be used as a barrier to block the passage of large ions as well as small ions.

EXAMPLE 10

Figure 9:
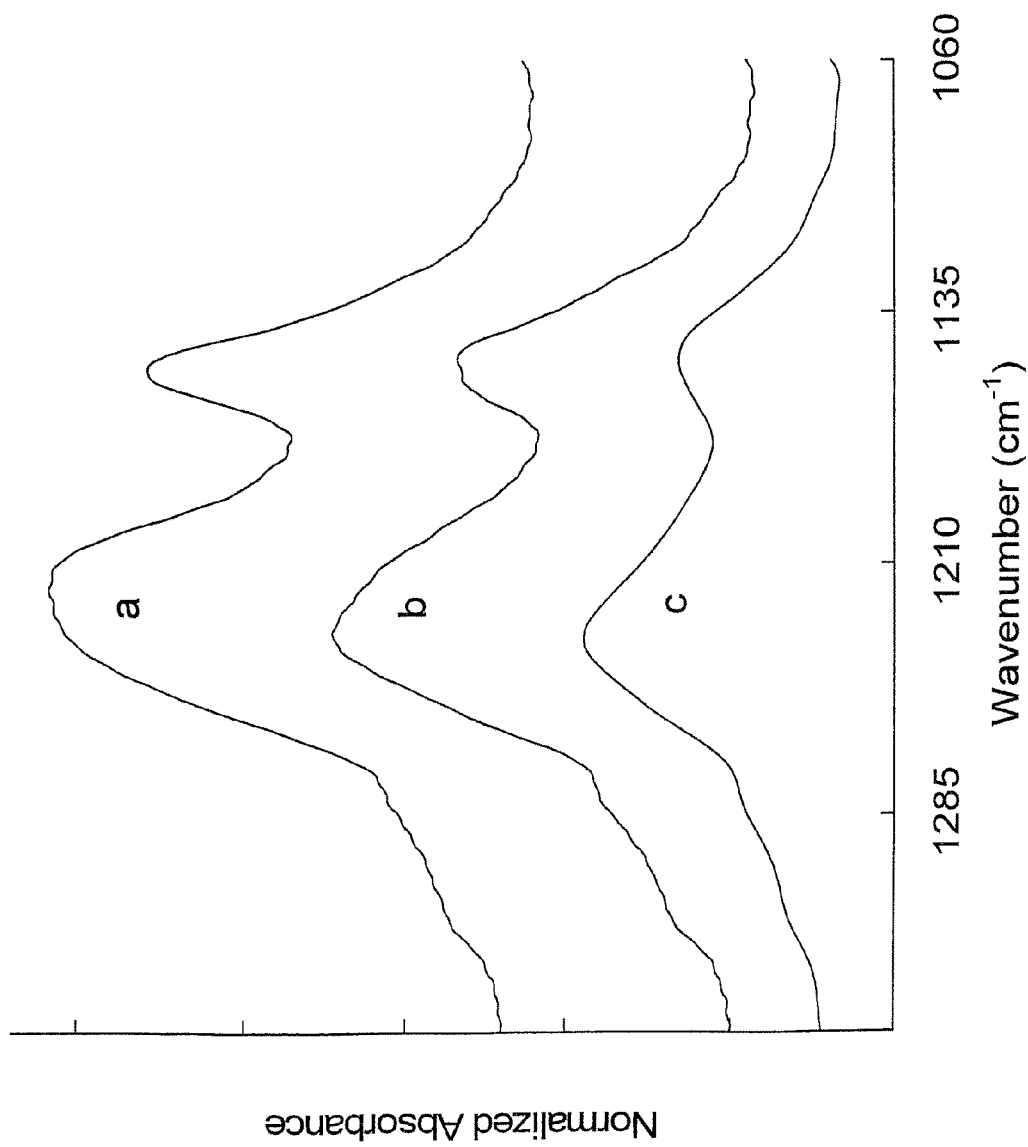
FIG. 9 shows FTIR spectra obtained according to the method of Example 10 of (a) (PFPVP/Nafion)$_{10}$ dipped in perfluorotetradecanoic acid, (b) (PFPVP/Nafion)$_{10}$, and (c) subtraction of spectrum (b) from (a). FTIR spectra were taken at 20% relative humidity and water vapor spectrum was subtracted from both.

Doping of Fluorinated Multilayer by a Fluorinated Counterion $(PFPVP/Nafion)_{10}$, prepared from 1 mM concentration of the relevant polyelectrolyte solution, was dipped for 10 minutes in 1 mM solution of perfluorotetradecanoic acid in methanol and then rinsed with water quickly afterwards. FTIR spectra of $(PFPVP/Nafion)_{10}$ (b in FIG. 9), $(PFPVP/Nafion)_{10}$ dipped in the perfluorinated acid (a in FIG. 9), as well as their subtraction (c in FIG. 9) are shown. The subtraction left fluorinated peaks centered at 1200 cm$^{-1}$ meaning that some of the fluorinated counterion (perfluorotetradecanoate) stayed in the multilayer. FTIR spectra were taken at 20% relative humidity and water vapor spectrum was subtracted from both as shown in FIG. 9.

EXAMPLE 11

Corrosion Protection of Steel Wires 316L stainless steel wires both uncoated and coated with a thin polyelectrolyte complex film were subjected to corroding potentials in salt water to evaluate the effectiveness of the polyelectrolyte complex films at suppressing corrosion currents. Experiments were conducted with an EG&G Princeton Applied Research (model 273) potentiostat with wire immersed in 0.7 M NaCl. To prepare them, wires were rinsed in hexane for about 5 minutes and then polished with number 1 Buehler Alpha micropolish Alumina (5.0 micrometer particle size) for approximately five minutes. Finally, they were washed and subjected to ultrasonic cleaning in deionized water for five minutes. "U"-shaped loops of these wires were then coated with alternating polyelectrolyte layers using 1.0 mM polymer solutions. Approximately 1 cm² of these coated wires were exposed to the electrolyte. The reference electrode was a KCl-saturated calomel electrode (SCE), against which all potentials were quoted. Experiments were carried out at 22±0.5° C. PSS/PDADMA was built up and rinsed in water solutions. Sulfonated poly(ether ether ketone) (SPEEK), Nafion™ and PFPVP were all deposited and washed in ethanol. No salt was employed in the build-up process.

Figure 10:
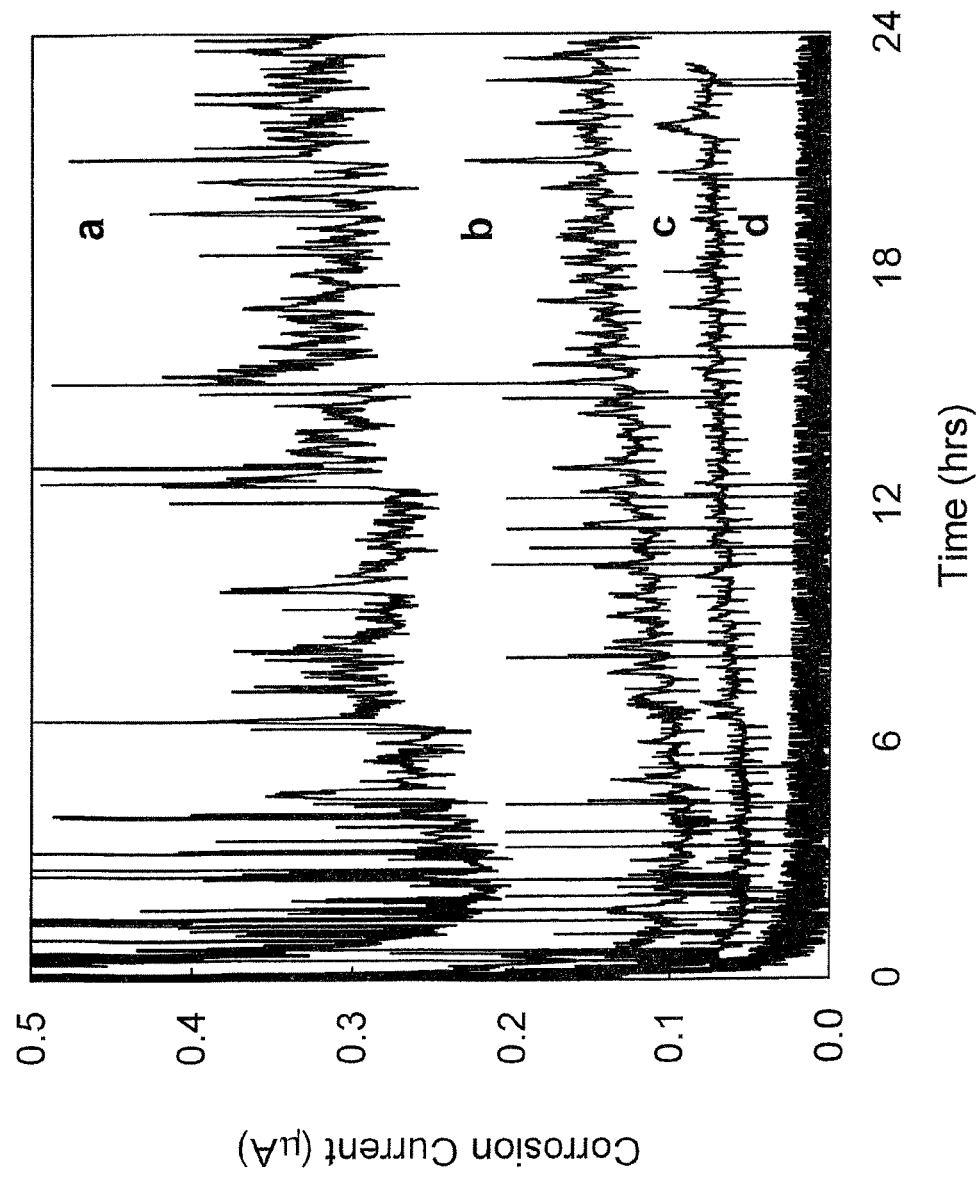
FIG. 10 shows corrosion current v. time for 316L steel wires immersed in 0.7 M NaCl poised at 0.45 V v. SCE obtained according to the method of Example 11. (a) Bare wire, (b) Coated wire, (PDADMA/PSS)$_{10}$, (c) Coated wire, (SPEEK/Nafion)$_{20}$, and (d) Coated wire, (PFPVP/Nafion)$_{40}$.

FIG. 10 shows the corrosion current v. time for coated and bare wires maintained at 0.45 V. v. SCE. This potential is in the metastable pitting regime, where pits form and then spontaneously passivate. Each pitting event gives a spike in current. The overall background corrosion current, as well as the pitting spikes, were significantly reduced for multilayer-coated wires. The most effective corrosion suppression was observed with the Nafion/PFPVP multilayer (d in FIG. 10), which was about 300 nm thick.

EXAMPLE 12

Corrosion Protection for Steel Plates

Figure 11B:
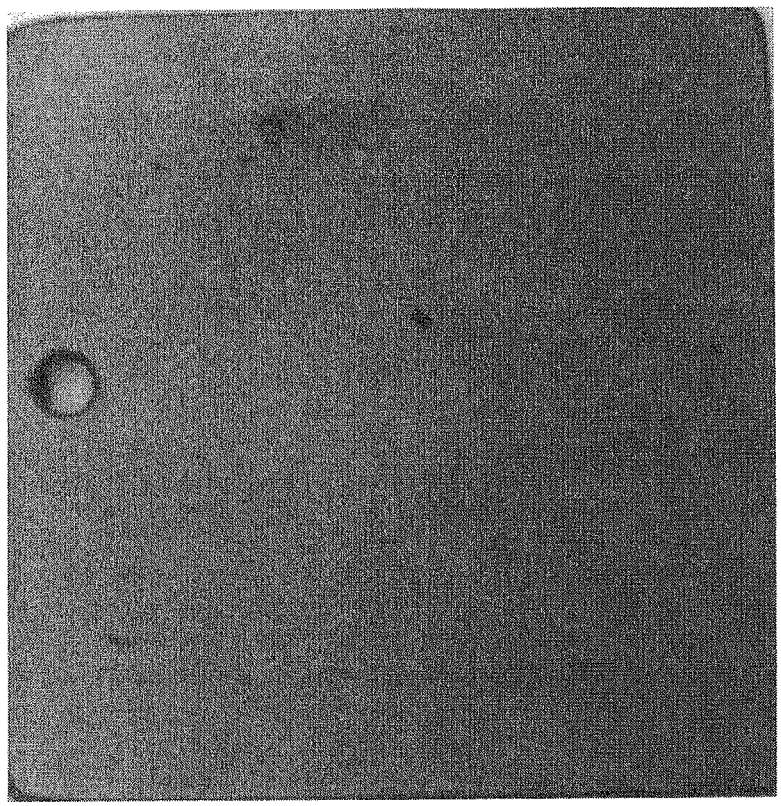
FIGS. 11A and 11B show steel plates after exposure to water vapor above 0.7 M NaCl for 6 months according to the method of Example 12.
Figure 11A:
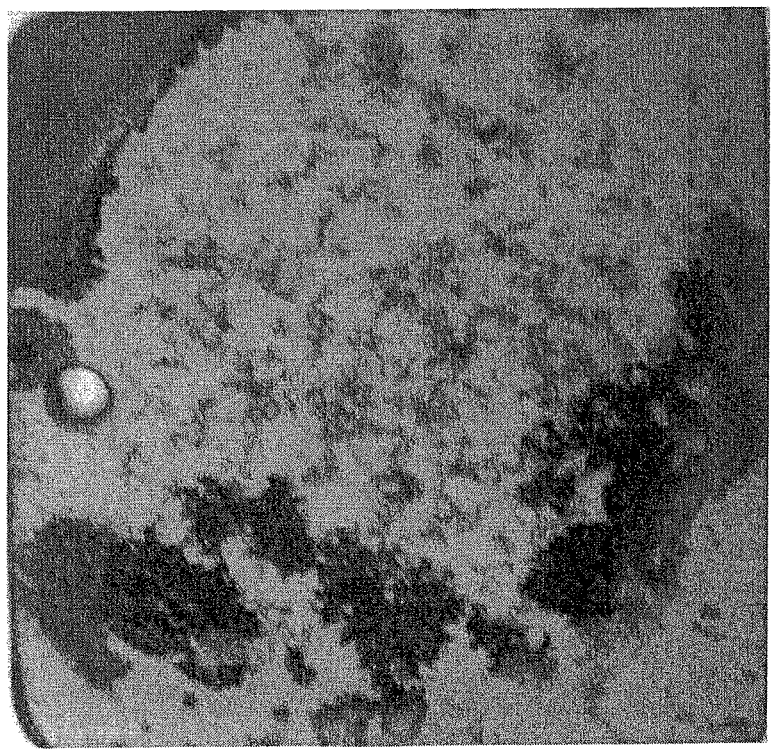

Cold rolled steel plates of thickness 3 mm and area 5×5 cm were sand blasted then rinsed in hexane. One plate was coated with a 40-layer PEMU of Nafion and PFPVP (thickness of about 300 nm) using 1 mM polymer solutions in methanol and ethanol, respectively (5 min deposition time), and methanol rinse (1 minutes). The plates were then placed on top of beakers filled with 0.7 M NaCl for 6 months to simulate a saline water environment. Plates were removed and photographed. The uncoated plate (shown in FIG. 11A) was corroded, yet the HFTFPC-coated plate (shown in FIG. 11B) showed no evidence of corrosion.

EXAMPLE 13

Resistance of HFTFPC to Chemical Attack

A HFTFPC of 20 alternating layers of Nafion and PFPVP was prepared on a silicon wafer. The thickness of this HFTFPC was 300 nm. The silicon wafer was immersed in a bath comprising 70 volume % of concentrated sulfuric acid and 30 volume % of concentrated hydrogen peroxide, also known to those skilled in the art as "piranha" solution. Piranha is a particularly aggressive mixture for oxidizing and breaking down organic materials and is used extensively to make very clean surfaces. After agitation, the HFTFPC floated off the silicon wafer and to the surface of the piranha, where it remained intact for the observation period (1 hour). By contrast, polyelectrolyte multilayers made from nonperfluorinated polyelectrolytes were immediately attacked by piranha and disappeared within 10 seconds.

In view of the above, it will be seen that the several objects of the invention are achieved and other advantageous results attained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A fuel cell comprising a proton transporting membrane, wherein the proton transporting membrane comprises a polyelectrode film comprising a multilayer interpenetrating network of a net positively charged polyelectrolyte polymer comprising repeat units with at least two fluorine atoms and a net negatively charged polyelectrolyte polymer comprising repeat units with at least two fluorine atoms, and further comprising a perfluorinated counterion within the multilayer;

wherein the perfluorinated counterion comprises a perfluorinated alkanesulfonic acid, a perfluorinated alkanecarboxylic acid, or both; and wherein said perfluorinated alkanesulfonic acid, said perfluorinated alkanecarboxylic acid or both has at least four fluorine atoms and an alkane component having a molecular weight up to 300 g per mole.

2. The fuel cell of claim 1 wherein the polyelectrolyte film is on a surface of a porous support.

3. The fuel cell of claim 1 wherein the polyelectrolyte film is on a surface of a porous support, the porous support comprising pores that are less than 10 micrometers.

4. The fuel cell of claim 1 wherein the interpenetrating network has a thickness below 1000 nm.

5. The fuel cell of claim 1 wherein the interpenetrating network has a thickness below 100 nm.

6. The fuel cell of claim 1 wherein the proton transporting membrane separates two compartments, each compartment comprising an acidic solution comprising perfluorinated counterion.

7. The fuel cell of claim 1 wherein the perfluorinated counterion comprises a fluorinated alkanesulfonic acid, a fluorinated alkanecarboxylic acid, or both; an alkane component of the acid having a molecular weight up to 300 g per mole; and at least four fluorine atoms.

8. The fuel cell of claim 1 wherein the net positively charged polyelectrolyte polymer and the net negatively charged polyelectrolyte polymer are independently selected from the group consisting of polyolefins, polyamines, polyamides, polyethers, polyesters, polyimides, polysulfones, polyaryls, polyphenols, polyaramides, and copolymers thereof.

9. The fuel cell of claim 8 wherein the net positively charged polyelectrolyte polymer and the net negatively charged polyelectrolyte polymer comprise repeat units having the structure:

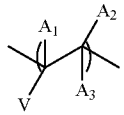

wherein $A_1$, $A_2$, and $A_3$ are each independently —$(CH_2)_m$H or —$(CH_xF_{2-x})_n$F; m and n are independently 0 to 12; x is 0, 1, or 2; and each V is independently selected from the group consisting of:

fluorinated hydrocarbons having the formula: —$(CH_2)_p(CF_2)_qF$; —$(CH_2)_p(CF_2)_qCOOH$; —$(CH_2)_p(CF_2)_qOPO_3^-$; —$(CH_2)_p(CF_2)_qSO_3^-$; —$(CH_2)_p(CF_2)_qOSO_3^-$; —$O(CH_2)_p$—$(CF_2)_q$—F; or —$O(CH_2)_p(CF_2)_q$—$SO_3^-$;

fluorinated amides having the formulae —$CONB_1$ wherein $B_1$ is —$(CH_2)_p(CF_2)_qF$; —$(CH_2)_p(CF_2)_qCOOH$; —$(CH_2)_p(CF_2)_qOPO_3^-$; —$(CH_2)_p(CF_2)_qSO_3^-$; or —$(CH_2)_p(CF_2)_qOSO_3^-$;

fluorinated esters having the formulae —$COOC_1$ wherein $C_1$ is —$(CH_2)_p(CF_2)_qF$; —$(CH_2)_p(CF_2)_qCOOH$; —$(CH_2)_p(CF_2)_qOPO_3^-$; —$(CH_2)_p(CF_2)_qSO_3^-$; or —$(CH_2)_p(CF_2)_qOSO_3^-$;

fluorinated phenyl groups having the formulae:

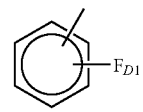

wherein D1 is 2 to 5; or

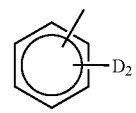

wherein $D_2$ is —$(CH_2)_p(CF_2)_qF$ or —$O(CH_2)_p(CF_2)_qF$;

fluorinated pyridiniums having the formulae:

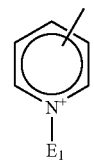

wherein $E_1$ is —$(CH_2)_p(CF_2)_qF$;

fluorinated imidazoliums having the formulae:

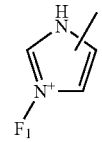

wherein $F_1$ is —$(CH_2)_p(CF_2)_qF$;

fluorinated quaternary nitrogens having the formulae —$N^+G_1G_2G_3$ where $G_1$, $G_2$, and $G_3$ are each independently —$(CH_2)_p(CF_2)_qF$ or -aryl$F_z$ wherein z is 2 to 8;

fluorinated sulfoniums having the formulae —$S^+H_1H_2$ where $H_1$ and $H_2$ are independently —$(CH_2)_p(CF_2)_qF$; Or -aryl$F_z$ where z is 2 to 8; and fluorinated phosphoniums having the formulae —$P^+J_1J_2J_3$ where $J_1$, $J_2$, and $J_3$ are independently: —$(CH_2)_p(CF_2)$—F; or -aryl$F_z$ where z is 2 to 8;

p is 0 to 6 and q is 1 to 21.

10. The fuel cell of claim 8 wherein the positively charged polyelectrolyte polymer comprises a repeat unit comprising an allyl group having the structure:

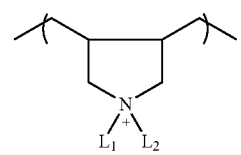

wherein $L_1$ and $L_2$ are —$(CH_2)_p(CF_2)$—F, p and q are independently selected for $L_1$ and $L_2$, and p is 0 to 6 and q is 1 to 21.

11. The fuel cell of claim 1 wherein the net positively charged polyelectrolyte polymer and the net negatively charged polyelectrolyte polymer are polyolefins having vinyl groups.

12. The fuel cell of claim 11 wherein the vinyl group is an allyl group.

13. The fuel cell of claim 1 wherein the net positively charged polyelectrolyte polymer has the structure:

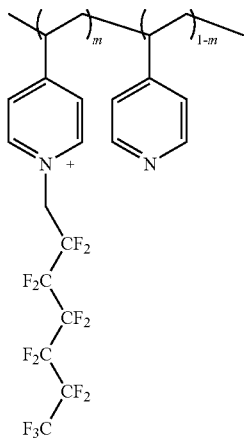

wherein m is a mole fraction from about 0.1 to about 1.0.

14. The fuel cell of claim 1 wherein the net negatively charged polyelectrolyte polymer has the structure:

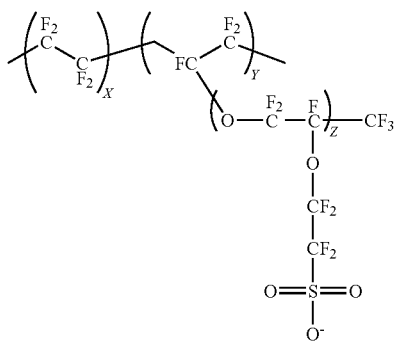

wherein X is from about 6 to about 10, Y is about 1, and Z is from about 1 to about 3.

15. The fuel cell of claim 1 wherein the polyelectrolyte film further comprising particles having a size in the range of about 1 nanometer to about 10 micrometers.

16. The fuel cell of claim 15 wherein the particles are selected from the group consisting of silicon dioxide, aluminum oxide, titanium dioxide, iron oxide, zirconium oxide, vanadium oxide, clay minerals, carbon fibers, carbon nanotubes, and charged fluorinated particles.

17. The fuel cell of claim 16 wherein the particle is the clay mineral, and the clay mineral comprises attapulgite clay.

18. The fuel cell of claim 1 wherein the polyelectrolyte film is formed on the surface of a film of poly perfluorinated sulfonated ionomer, wherein the poly perfluorinated sulfonated ionomer film has a thickness between 2 micrometers and 1000 micrometers.

19. A fuel cell comprising a proton transporting membrane, the proton transporting membrane comprising a film comprising multilayers of a charged polyelectrolyte polymer comprising repeat units with at least two fluorine atoms electrostatically complexed with a perfluorinated charged particle comprising repeat units with at least two fluorine atoms, wherein the charge of the polyelectrolyte polymer is opposite that of the charge of the perfluorinated charged particle; wherein the multilayers comprise layer pairs and each layer pair comprises the polyelectrolyte polymer electrostatically complexed with the perfluorinated charged particle, and the multilayers are created from the polyelectrolyte polymer and an aqueous dispersion or suspension of the fluorinated polymer particles.

20. The fuel cell of claim 19 wherein the perfluorinated charged particle comprises polytetrafluoroethylene.

21. The fuel cell of claim 19 wherein the polyelectrolyte polymer comprises a plurality of charged repeat units with at least two fluorine atoms.

* * * * *